US010438418B2

(12) United States Patent
Iwai et al.

(10) Patent No.: US 10,438,418 B2
(45) Date of Patent: Oct. 8, 2019

(54) INFORMATION PROCESSING METHOD FOR DISPLAYING A VIRTUAL SCREEN AND SYSTEM FOR EXECUTING THE INFORMATION PROCESSING METHOD

(71) Applicant: COLOPL, Inc., Tokyo (JP)

(72) Inventors: Ryota Iwai, Tokyo (JP); Ryuji Okazaki, Tokyo (JP)

(73) Assignee: COLOPL, INC., Tokyo (JP)

( * ) Notice: Subject to any disclaimer, the term of this patent is extended or adjusted under 35 U.S.C. 154(b) by 0 days.

(21) Appl. No.: 15/835,449

(22) Filed: Dec. 7, 2017

(65) Prior Publication Data

US 2018/0165887 A1    Jun. 14, 2018

(30) Foreign Application Priority Data

Dec. 8, 2016 (JP) ................................. 2016-238745
Dec. 28, 2016 (JP) ................................. 2016-255987

(51) Int. Cl.
*G06T 19/20* (2011.01)
*G06T 19/00* (2011.01)
(Continued)

(52) U.S. Cl.
CPC ............. *G06T 19/20* (2013.01); *A63F 13/30* (2014.09); *G06F 1/163* (2013.01); *G06F 3/011* (2013.01);
(Continued)

(58) Field of Classification Search
CPC ...... G06F 3/011; G06T 19/003; G06T 19/006
See application file for complete search history.

(56) References Cited

U.S. PATENT DOCUMENTS 9,396,588 B1    7/2016  Li
2002/0080173 A1    6/2002  Tagami et al.
(Continued)

FOREIGN PATENT DOCUMENTS

JP    2000-11207 A    1/2000
JP    2000-40161 A    2/2000
(Continued)

OTHER PUBLICATIONS

Office Action in JP Application No. 2016-238745, dated Jun. 27, 2017, 7pp.
(Continued)

*Primary Examiner* — Ryan McCulley
(74) *Attorney, Agent, or Firm* — Hauptman Ham, LLP

(57) ABSTRACT

A method includes generating first virtual space data for defining a first virtual space. The first virtual space includes a first avatar associated with a first user terminal; and a first virtual room including the first avatar and a first virtual screen. The method includes detecting a movement of a head mounted device (HMD) included in the first user terminal. The method includes identifying a visual field in accordance with the detected movement of the HMD. The method includes displaying, on the HMD, a visual-field image corresponding to the visual field. The method includes receiving, from a second user terminal, a visiting request signal requesting that a second avatar associated with the second user terminal visit the first virtual room. The method includes updating the first virtual space data by updating a size of the first virtual screen based on a number of avatars arranged in the first virtual room.

20 Claims, 31 Drawing Sheets

(51) Int. Cl.

| | | |
|---|---|---|
| *G06F 3/01* | (2006.01) | |
| *G06Q 30/04* | (2012.01) | |
| *G06T 15/20* | (2011.01) | |
| *G06F 1/16* | (2006.01) | |
| *G06F 3/03* | (2006.01) | |
| *A63F 13/30* | (2014.01) | |
| *G06F 3/16* | (2006.01) | |

(52) U.S. Cl.
 CPC .............. *G06F 3/012* (2013.01); *G06F 3/013* (2013.01); *G06F 3/0304* (2013.01); *G06Q 30/04* (2013.01); *G06T 15/20* (2013.01); *G06T 19/003* (2013.01); *G06F 3/167* (2013.01); *G06T 2219/024* (2013.01); *G06T 2219/2016* (2013.01)

(56) References Cited

U.S. PATENT DOCUMENTS

| | | | |
|---|---|---|---|
| 2009/0175559 A1* | 7/2009 | Hamilton, II | A63F 13/60 |
| | | | 382/298 |
| 2009/0222744 A1* | 9/2009 | Renner | G06Q 10/10 |
| | | | 715/757 |
| 2012/0026177 A1* | 2/2012 | Johlic | G09G 5/00 |
| | | | 345/522 |
| 2013/0073707 A1* | 3/2013 | Butler | H04L 67/38 |
| | | | 709/223 |
| 2013/0141421 A1* | 6/2013 | Mount | H04N 21/41407 |
| | | | 345/419 |
| 2015/0163473 A1 | 6/2015 | Osawa et al. | |
| 2016/0300387 A1* | 10/2016 | Ziman | G06T 19/003 |
| 2017/0150230 A1 | 5/2017 | Shimura et al. | |
| 2017/0228928 A1 | 8/2017 | Terahata | |
| 2017/0256096 A1* | 9/2017 | Faaborg | G06T 19/20 |
| 2017/0344220 A1* | 11/2017 | Cook | G06T 13/40 |

FOREIGN PATENT DOCUMENTS

| | | |
|---|---|---|
| JP | 2002-140278 A | 5/2002 |
| JP | 2002-149581 A | 5/2002 |
| JP | 2005-322125 A | 11/2005 |
| JP | 2007-328389 A | 12/2007 |
| JP | 2014-17776 A | 1/2014 |
| JP | 2014-21707 A | 2/2014 |
| JP | 5996814 B1 | 9/2016 |
| JP | 2016-197411 A | 11/2016 |
| WO | 2016/002445 A1 | 1/2016 |

OTHER PUBLICATIONS

Notice of Allowance in JP Application No. 2016-238745, dated Aug. 1, 2017, 6pp.

Office Action in JP Application No. 2016-255987, dated Jun. 20, 2017, 6pp.

Notice of Allowance in JP Application No. 2016-255987, dated Aug. 8, 2017, 5pp.

\* cited by examiner

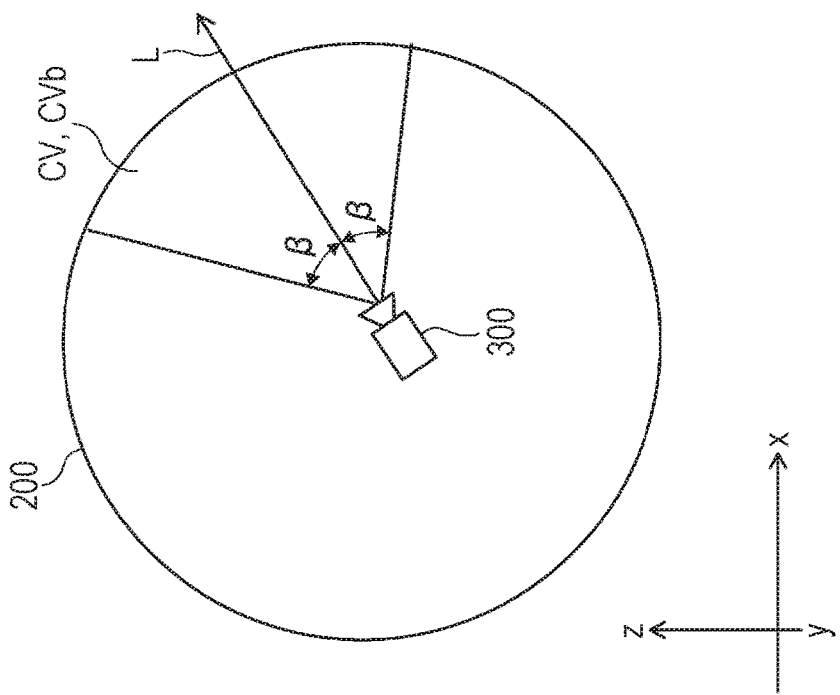
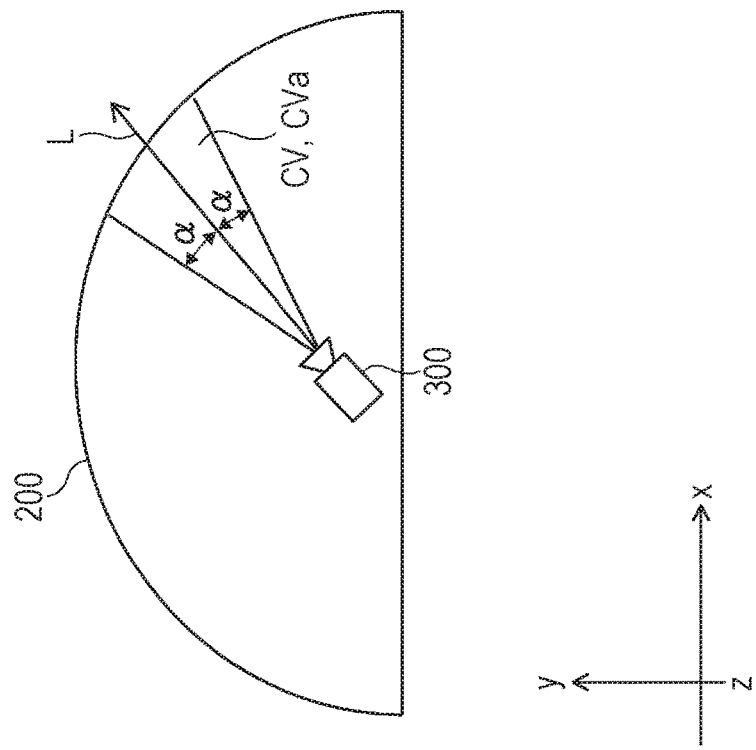

FIG. 16A

VIDEO CONTENT CHARGE TABLE

| VIDEO CONTENT | VIEWING UNIT PRICE | CHARGE AFTER GROUP DISCOUNT | ADDITIONAL CHARGE FOR ENLARGING VIRTUAL SCREEN (OF M SIZE) | ADDITIONAL CHARGE FOR ENLARGING VIRTUAL SCREEN (OF L SIZE) |
|---|---|---|---|---|
| V1 | 300 YEN | 200 YEN | 500 YEN | 1000 YEN |
| V2 | 500 YEN | 300 YEN | 500 YEN | 1000 YEN |

FIG. 16B

BILLING TABLE

| USER | VIEWED VIDEO CONTENT | VIEWING STYLE | CHARGE FOR ENLARGING SCREEN SIZE | SUBTOTAL | TOTAL |
|---|---|---|---|---|---|
| A | V1 | INDIVIDUAL | 500 YEN | 800 YEN | 1100 YEN |
| A | V2 | GROUP | NONE | 300 YEN | 1100 YEN |
| B | V1 | INDIVIDUAL | NONE | 300 YEN | 300 YEN |

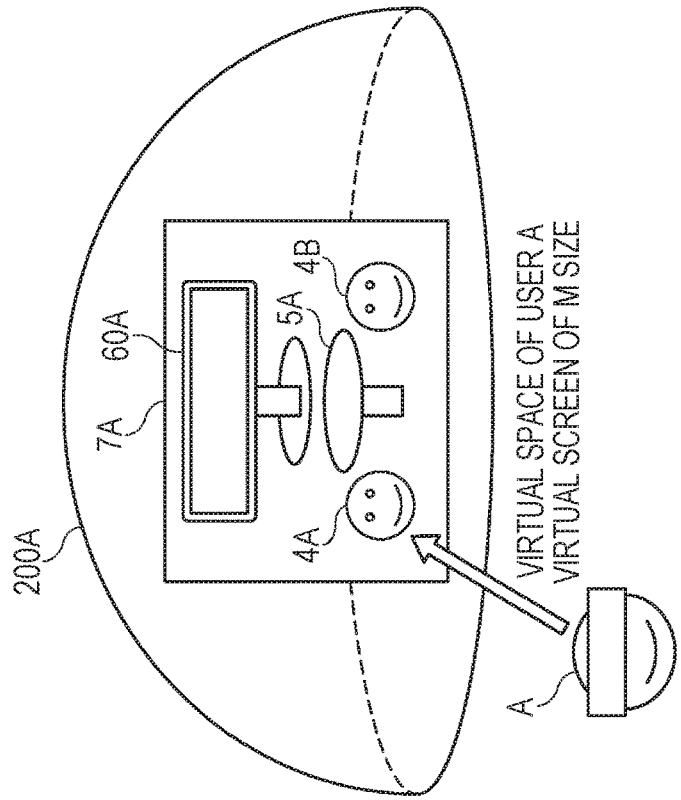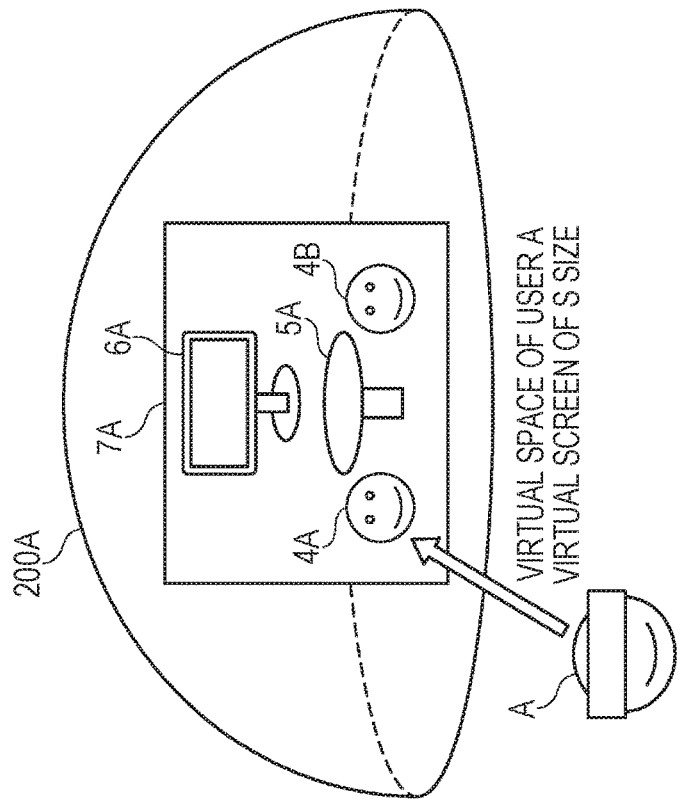

INFORMATION PROCESSING METHOD FOR DISPLAYING A VIRTUAL SCREEN AND SYSTEM FOR EXECUTING THE INFORMATION PROCESSING METHOD

RELATED APPLICATIONS

The present application claims priority to JP2016-238745 filed Dec. 8, 2016 and JP2016-255987 filed Dec. 28, 2016, the disclosures of which are hereby incorporated by reference herein in their entirety.

BACKGROUND

This disclosure relates to an information processing method and a system for executing the information processing method.

In Japanese Patent Application Laid-open No. 2014-017776, there is described a technology for identifying a positional relationship among a plurality of users in the real space and then determining a positional relationship between a plurality of user characters (avatars) within a virtual space based on the identified positional relationship among the plurality of users.

In WO 2016/002445 A1, there is described an information processing system in which only users having lines of sight directed to the same object among a plurality of users sharing content are allowed to exchange voice information with one another.

In U.S. Pat. No. 9,396,588, there is described a technology for arranging a virtual screen, a virtual video projector, and virtual seats, which are provided as a virtual movie theater, within a virtual space, to thereby provide a user wearing a head-mounted device (hereinafter referred to simply as "HMD") with an experience of enjoying a movie at a movie theater.

In Japanese Patent Application Laid-open No. 2014-017776, WO 2016/002445 A1, and U.S. Pat. No. 9,396,588, there is no description regarding how to control a virtual room in which a plurality of user characters (avatars) are arranged.

SUMMARY (1) According to at least one embodiment of this disclosure, there is provided an information processing method to be executed by a computer in a virtual space distribution system. The virtual space distribution system includes a plurality of user terminals each including a head-mounted display to be worn on a head of a user; and a server.

The information processing method includes generating first virtual space data for defining a first virtual space. The first virtual space includes a first avatar associated with a first user terminal among the plurality of user terminals; and a first virtual room in which the first avatar is arranged. The method further includes receiving, from a second user terminal among the plurality of user terminals, a visiting request signal for requesting that a second avatar associated with the second user terminal visit the first virtual room. The method further includes determining, in response to the visit request signal, whether or not the first virtual room is to be updated based on a total number of avatars currently arranged in the first virtual room and second avatars. The method further includes updating, in response to a determination that the first virtual room is to be updated, the first virtual room so as to update a size of the first virtual room.

BRIEF DESCRIPTION OF THE DRAWINGS

FIG. 7A is a yx plane diagram of the virtual space illustrated in FIG. 6.

FIG. 7B is a zx plane diagram of the virtual space according to at least one embodiment of this disclosure.

FIG. 16A is a table of a video content charge table according to at least one embodiment of this disclosure.

FIG. 16B is a table of a billing table according to at least one embodiment of this disclosure.

FIG. 18A is a diagram of the virtual space provided to the user A according to at least one embodiment of this disclosure.

FIG. 18B is a diagram of the virtual space provided to the user A according to at least one embodiment of this disclosure.

DETAILED DESCRIPTION

Embodiments of this disclosure are described below with reference to the drawings. Once a component is described in this description of the embodiments, a description on a component having the same reference number as that of the already described component is omitted for the sake of convenience.

Figure 1:
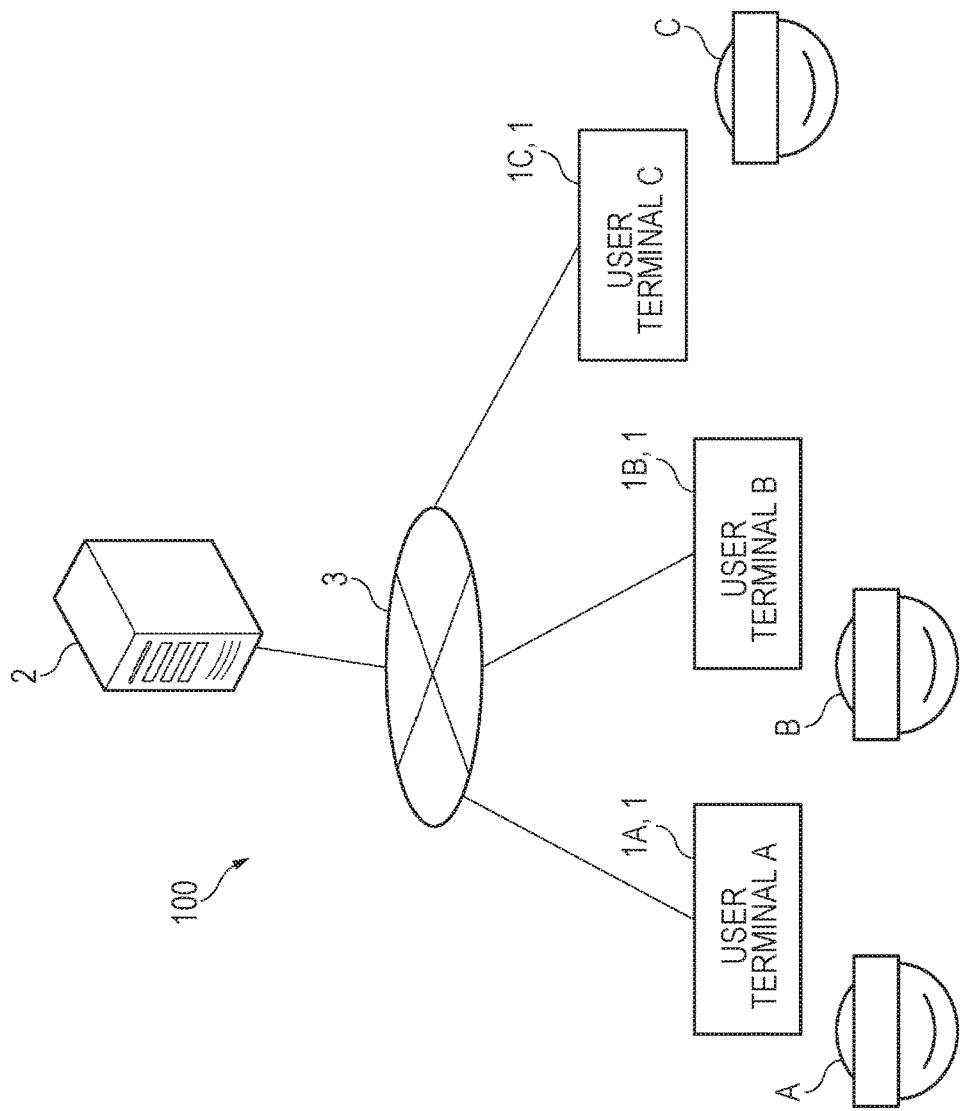
FIG. 1 is a schematic diagram of a virtual space distribution system according to at least one embodiment of this disclosure.

With reference to FIG. 1, a description is given of a schematic configuration of a virtual space distribution system 100 (or a social VR system). FIG. 1 is a schematic diagram of the virtual space distribution system 100 (hereinafter referred to simply as "distribution system 100") according to at least one embodiment of this disclosure. In FIG. 1, the distribution system 100 includes a user terminal 1A operated by a user A, a user terminal 1B operated by a user B, a user terminal 1C operated by a user C, and a server 2. The user terminals 1A to 1C are connected to the server 2 through a communication network 3, for example, the Internet, so as to enable communication between each of the user terminals 1A to 1C and the server 2. In at least one embodiment, a virtual space includes a virtual reality (VR) space, an augmented reality (AR) space, or a mixed reality (MR) space. In the following, for the sake of convenience in description, each of the user terminals 1A to 1C may be collectively referred to simply as "user terminal 1". Further, each of the users A to C may be collectively referred to simply as "user U". In at least one embodiment, the user terminals 1A to 1C are assumed to have the same configuration.

Figure 2:
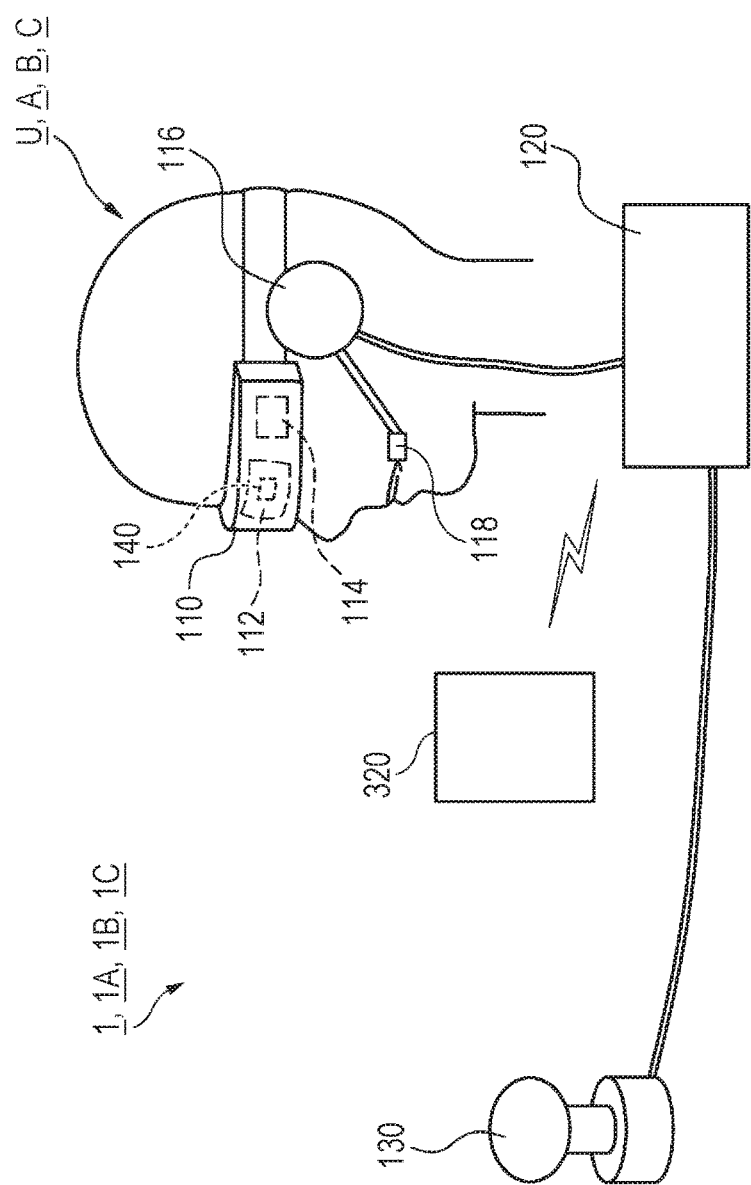
FIG. 2 is a schematic diagram of a user terminal according to at least one embodiment of this disclosure.

With reference to FIG. 2, a description is given of a configuration of the user terminal 1. FIG. 2 is a schematic diagram of the user terminal 1 according to at least one embodiment of this disclosure. In FIG. 2, the user terminal 1 includes a head-mounted device (HMD) 110 worn on a head of the user U, headphones 116, a microphone 118, a position sensor 130, an external controller 320, and a control device 120.

The HMD 110 includes a display unit 112, an HMD sensor 114, and an eye gaze sensor 140. The display unit 112 includes a non-transmissive display device configured to completely cover a field of view (visual field) of the user U wearing the HMD 110. With this, the user U can see only a visual-field image displayed on the display unit 112, and hence the user U can be immersed in a virtual space. The display unit 112 may include a left-eye display unit configured to provide an image to a left eye of the user U, and a right-eye display unit configured to provide an image to a right eye of the user U. The HMD 110 may include a transmissive display device. In this case, the transmissive display device may be configured to temporarily function as a non-transmissive display device through adjustment of a transmittance.

The HMD sensor 114 is mounted near the display unit 112 of the HMD 110. The HMD sensor 114 includes at least one of a geomagnetic sensor, an acceleration sensor, and an inclination sensor (for example, an angular velocity sensor or a gyro sensor), and can detect various movements of the HMD 110 worn on the head of the user U.

The eye gaze sensor 140 has an eye tracking function of detecting a line-of-sight direction of the user U. For example, the eye gaze sensor 140 may include a right-eye gaze sensor and a left-eye gaze sensor. The right-eye gaze sensor may be configured to detect reflective light reflected from the right eye (in particular, the cornea or the iris) of the user U by irradiating the right eye with, for example, infrared light, to thereby acquire information relating to a rotational angle of a right eyeball. The left-eye gaze sensor may be configured to detect reflective light reflected from the left eye (in particular, the cornea or the iris) of the user U by irradiating the left eye with, for example, infrared light, to thereby acquire information relating to a rotational angle of a left eyeball.

The headphones 116 are worn on right and left ears of the user U. The headphones 116 are configured to receive sound data (electrical signal) from the control device 120 to output sounds based on the received sound data. The microphone 118 is configured to collect sounds uttered by the user U, and to generate sound data (i.e., electric signal) based on the collected sounds. The microphone 118 is also configured to transmit the sound data to the control device 120.

The position sensor 130 is constructed of, for example, a position tracking camera, and is configured to detect the positions of the HMD 110 and the external controller 320. The position sensor 130 is connected to the control device 120 so as to enable communication to/from the control device 120 in a wireless or wired manner. The position sensor 130 is configured to detect information relating to positions, inclinations, or light emitting intensities of a plurality of detection points (not shown) provided in the HMD 110. Further, the position sensor 130 is configured to detect information relating to positions, inclinations, and/or light emitting intensities of a plurality of detection points (not shown) provided in the external controller 320. The detection points are, for example, light emitting portions configured to emit infrared light or visible light. The position sensor 130 may include an infrared sensor or a plurality of optical cameras.

The external controller 320 is used to control, for example, a movement of a finger object to be displayed in the virtual space. The external controller 320 may include a right-hand external controller to be used by being held by a right hand of the user U, and a left-hand external controller to be used by being held by a left hand of the user U.

The control device 120 is capable of acquiring information on the position of the HMD 110 based on the information acquired from the position sensor 130, and accurately associating the position of the virtual camera (or an avatar associated with the user U) in the virtual space with the position of the user U wearing the HMD 110 in the real space based on the acquired information on the position of the HMD 110. Further, the control device 120 is capable of acquiring information on the movement of the external controller 320 based on the information acquired from the position sensor 130, and accurately associating the movement of the finger object (the fingers of the avatar associated with the user U) to be displayed in the virtual space with the movement of the external controller 320 in the real space based on the acquired information on the movement of the external controller 320.

The control device 120 is capable of identifying each of the line of sight of the right eye and the line of sight of the left eye of the user U based on the information transmitted from the eye gaze sensor 140, to thereby identify a point of gaze being an intersection between the line of sight of the right eye and the line of sight of the left eye. Further, the control device 120 is capable of identifying a line-of-sight direction of the user U based on the identified point of gaze. In this case, the line-of-sight direction of the user U is a line-of-sight direction of both eyes of the user U, and matches a direction of a straight line passing through the point of gaze and a midpoint of a line segment connecting between the right eye and the left eye of the user U. The control device 120 is capable of identifying a direction of an iris and pupil of the avatar associated with the user U based on the line-of-sight direction of the user U.

Figure 3:
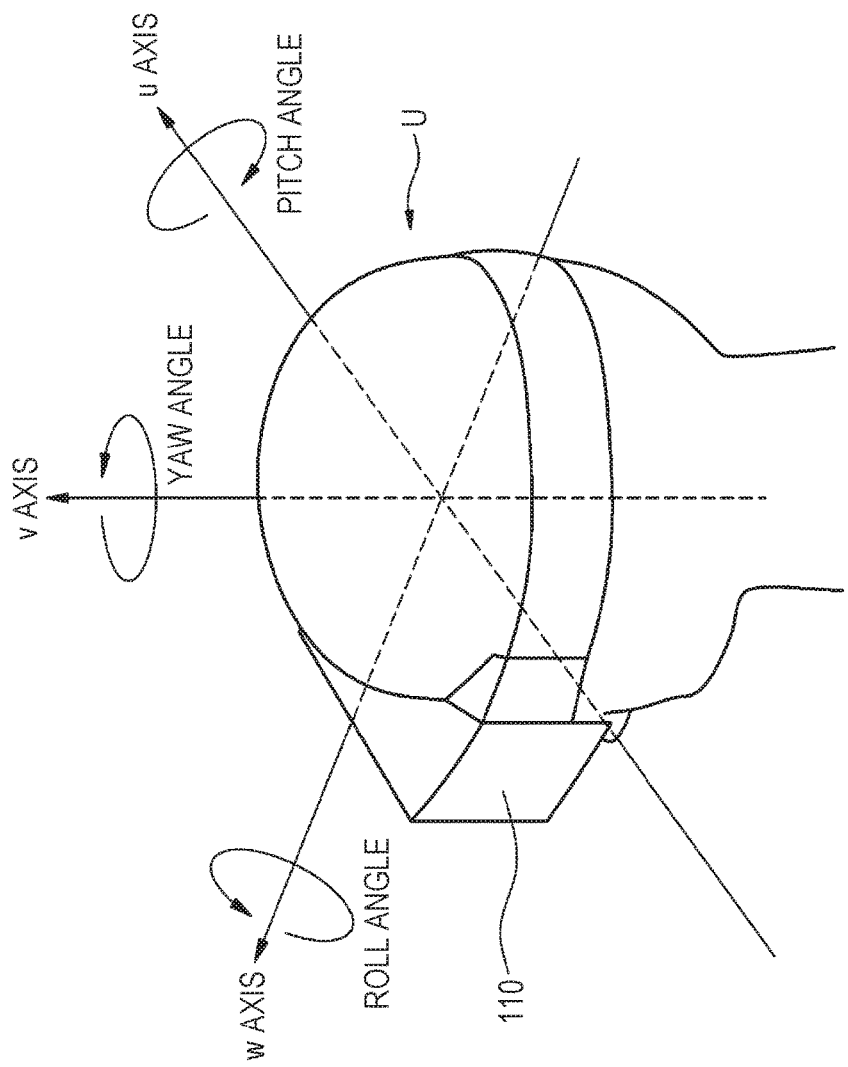
FIG. 3 is a diagram of a head of a user wearing an HMD according to at least one embodiment of this disclosure.

With reference to FIG. 3, a method of acquiring information relating to a position and an inclination of the HMD 110 is described. FIG. 3 is a diagram of the head of the user U wearing the HMD 110 according to at least one embodiment of this disclosure. The information relating to the position and the inclination of the HMD 110, which move in association with the movement of the head of the user U wearing the HMD 110, can be detected by the position sensor 130 and/or the HMD sensor 114 mounted on the HMD 110. In FIG. 3, three-dimensional coordinates (uvw coordinates) are defined about the head of the user U wearing the HMD 110. A perpendicular direction in which the user U stands upright is defined as a v axis, a direction being orthogonal to the v axis and passing through the center of the HMD 110 is defined as a w axis, and a direction orthogonal to the v axis and the w axis is defined as a u direction. The position sensor 130 and/or the HMD sensor 114 are/is configured to detect angles about the respective uvw axes (that is, inclinations determined by a yaw angle representing the rotation about the v axis, a pitch angle representing the rotation about the u axis, and a roll angle representing the rotation about the w axis). The control device 120 is configured to determine angular information for controlling a visual axis of the virtual camera based on the detected change in angles about the respective uvw axes.

Figure 4:
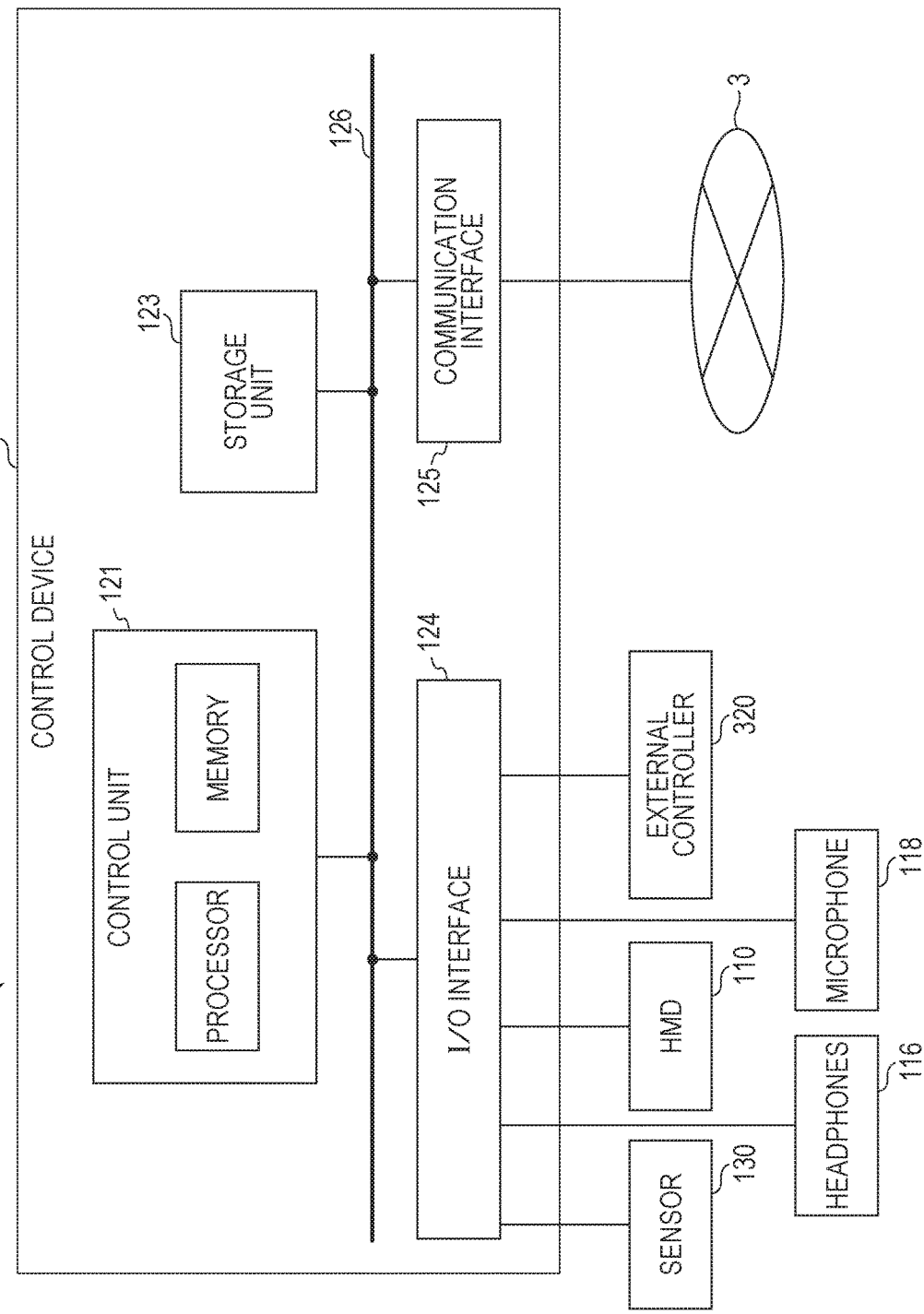
FIG. 4 is a diagram of a hardware configuration of a control device according to at least one embodiment of this disclosure.

With reference to FIG. 4, a hardware configuration of the control device 120 is described. FIG. 4 is a diagram of the hardware configuration of the control device 120 according to at least one embodiment. In FIG. 4, the control device 120 includes a control unit 121, a storage unit 123, an input/output (I/O) interface 124, a communication interface 125, and a bus 126. The control unit 121, the storage unit 123, the I/O interface 124, and the communication interface 125 are connected to each other via the bus 126 so as to enable communication therebetween.

The control device 120 may be constructed as a personal computer, a tablet computer, or a wearable device separately from the HMD 110, or may be built into the HMD 110. A part of the functions of the control device 120 may be mounted to the HMD 110, and the remaining functions of the control device 120 may be mounted to another device separate from the HMD 110.

The control unit 121 includes a memory and a processor. The memory is constructed of, for example, a read only memory (ROM) having various programs and the like stored therein or a random access memory (RAM) having a plurality of work areas in which various programs to be executed by the processor are stored. The processor is constructed of, for example, a central processing unit (CPU), a micro processing unit (MPU) and/or a graphics processing unit (GPU), and is configured to load, on the RAM, programs designated by various programs installed into the ROM to execute various types of processing in cooperation with the RAM.

In particular, the control unit 121 may control various operations of the control device 120 by causing the processor to load a control program on the RAM to execute the control program in cooperation with the RAM. The control unit 121 displays the visual-field image on the display unit 112 of the HMD 110 based on visual-field image data. This allows the user U to be immersed in the virtual space.

The storage unit (storage) 123 is a storage device, for example, a hard disk drive (HDD), a solid state drive (SSD), or a USB flash memory, and is configured to store programs and various types of data. The storage unit 123 may store a control program for causing a computer to execute at least a part of an information processing method according to at least one embodiment, or a control program for achieving a social VR. The storage unit 123 may store programs for authentication of the user U and data relating to various images and objects (for example, virtual rooms and avatars). Further, a database including tables for managing various types of data may be constructed in the storage unit 123.

The I/O interface 124 is configured to connect each of the position sensor 130, the HMD 110, the external controller 320, the headphones 116, and the microphone 118 to the control device 120 so as to enable communication therebetween, and is constructed of, for example, a universal serial bus (USB) terminal, a digital visual interface (DVI) terminal, or a high-definition multimedia Interface® (HDMI) terminal. The control device 120 may be wirelessly connected to each of the position sensor 130, the HMD 110, the external controller 320, the headphones 116, and the microphone 118.

The communication interface 125 is configured to connect the control device 120 to the communication network 3, for example, a local area network (LAN), a wide area network (WAN), or the Internet. The communication interface 125 includes various wire connection terminals and various processing circuits for wireless connection for communication to/from an external device, for example, the server 2, via the communication network 3, and is configured to become compatible with communication standards for communication via the communication network 3.

Figure 5:
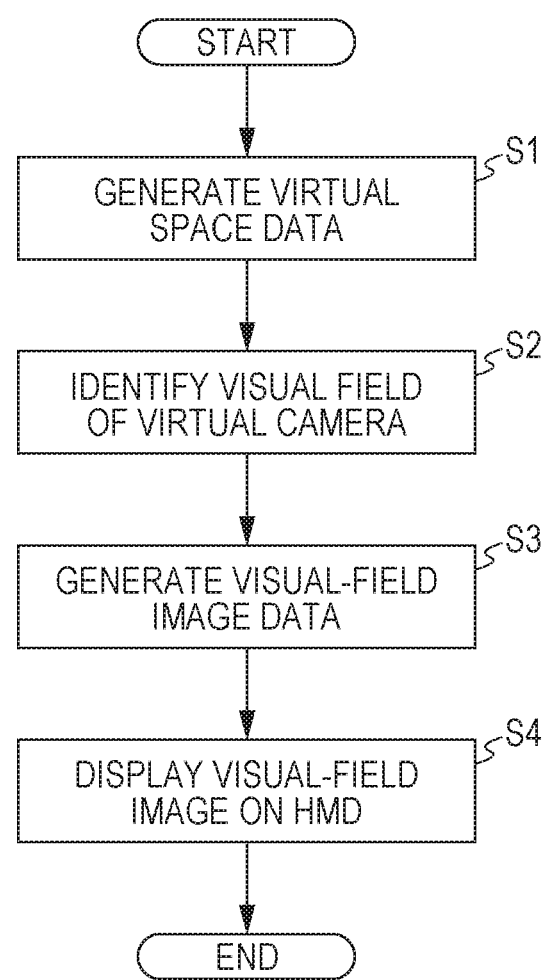
FIG. 5 is a flowchart of processing for displaying a visual-field image on the HMD according to at least one embodiment of this disclosure.
Figure 6:
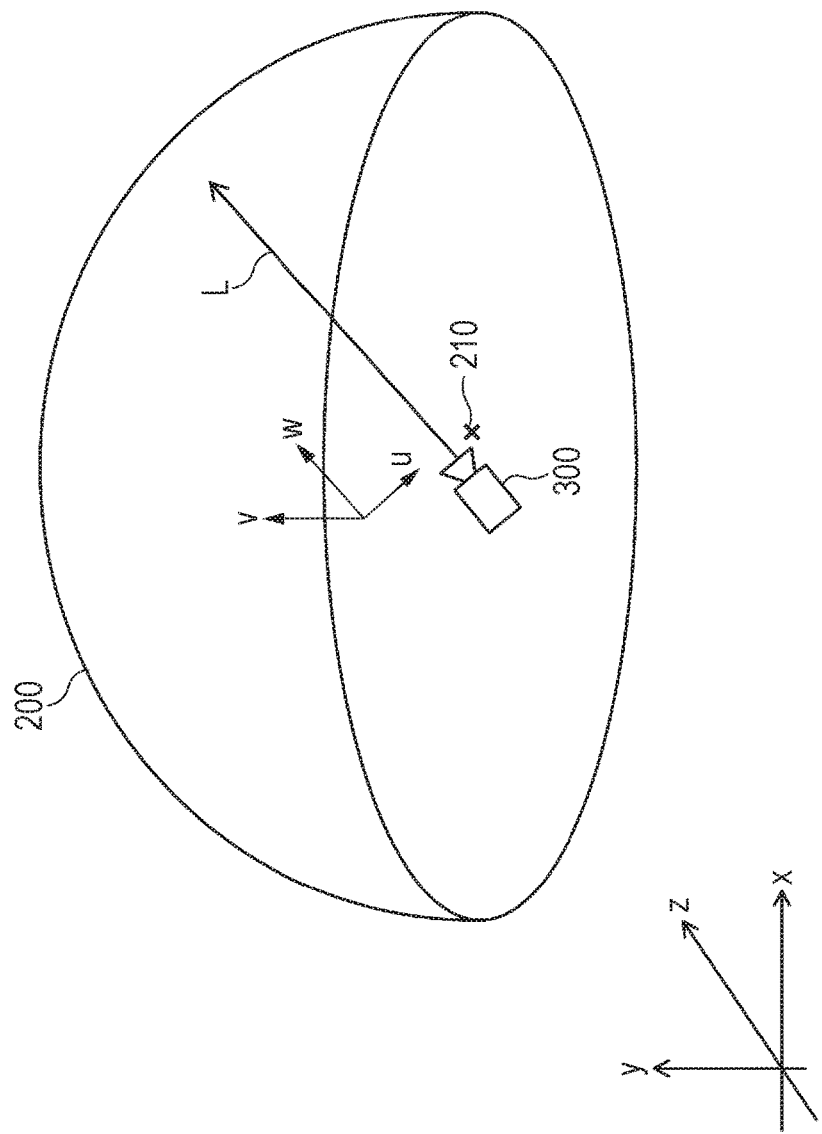
FIG. 6 is an xyz spatial diagram of a virtual space according to at least one embodiment of this disclosure.
Figure 8:
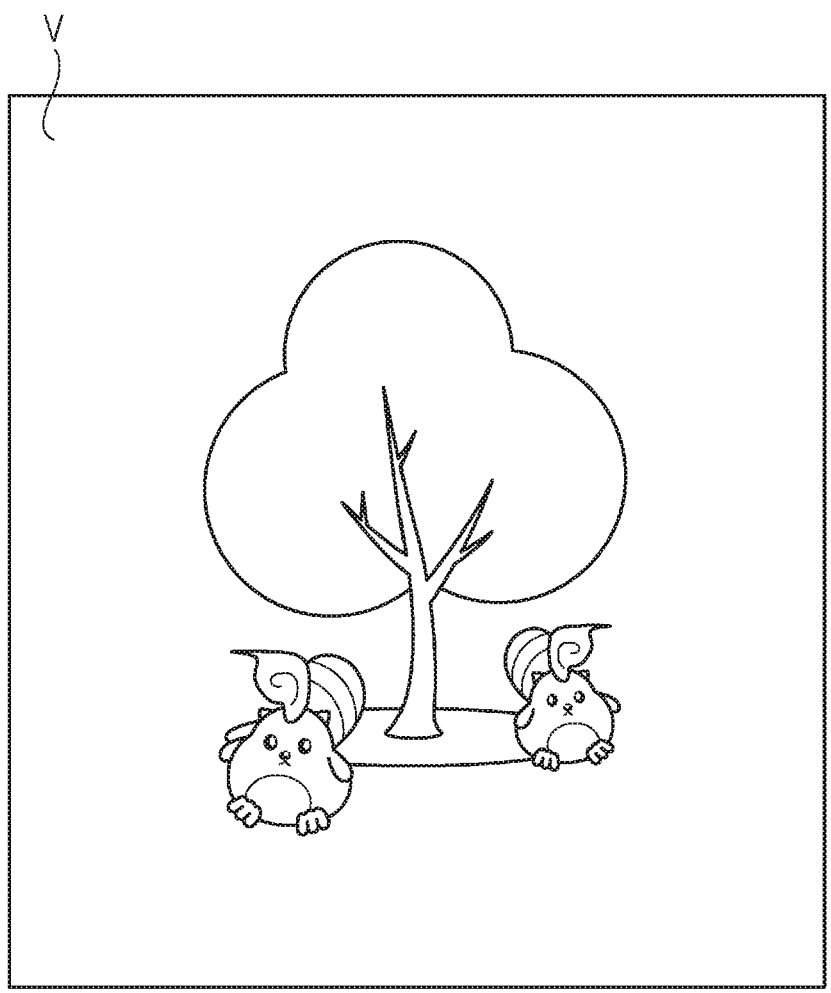
FIG. 8 is a diagram of the visual-field image displayed on the HMD according to at least one embodiment of this disclosure.

With reference to FIG. 5 to FIG. 8, processing of displaying the visual-field image on the HMD 110 is described. FIG. 5 is a flowchart of the processing of displaying the visual-field image on the HMD 110 according to at least one embodiment. FIG. 6 is an xyz spatial diagram of a virtual space 200 according to at least one embodiment. FIG. 7A is a yx plane diagram of the virtual space 200 in FIG. 6 according to at least one embodiment. FIG. 7B is a zx plane diagram of the virtual space 200 in FIG. 6 according to at least one embodiment. FIG. 8 is a diagram of a visual-field image V displayed on the HMD 110 according to at least one embodiment.

In FIG. 5, in Step S1, the control unit 121 (refer to FIG. 4) generates virtual space data representing the virtual space 200 including a virtual camera 300 and various objects. In FIG. 6, the virtual space 200 is defined as an entire celestial sphere having a center position 210 as the center (in FIG. 6, only the upper-half celestial sphere is included for clarity). In the virtual space 200, an xyz coordinate system having the center position 210 as the origin is set. The virtual camera 300 defines a visual axis L for identifying the visual-field image V (refer to FIG. 8) to be displayed on the HMD 110. The uvw coordinate system that defines the visual field of the virtual camera 300 is determined so as to move in association with the uvw coordinate system that is defined about the head of the user U in the real space. The control unit 121 may move the virtual camera 300 in the virtual space 200 in association with the movement in the real space of the user U wearing the HMD 110.

In Step S2, the control unit 121 identifies a visual field CV (refer to FIG. 7A and FIG. 7B) of the virtual camera 300. Specifically, the control unit 121 acquires information relating to a position and an inclination of the HMD 110 based on data representing the state of the HMD 110, which is transmitted from the position sensor 130 and/or the HMD sensor 114. The control unit 121 identifies the position and the direction of the virtual camera 300 in the virtual space 200 based on the information relating to the position and the inclination of the HMD 110. The control unit 121 determines the visual axis L of the virtual camera 300 based on the position and the direction of the virtual camera 300, and identifies the visual field CV of the virtual camera 300 based on the determined visual axis L. In this case, the visual field CV of the virtual camera 300 corresponds to a part of the region of the virtual space 200 that can be visually recognized by the user U wearing the HMD 110 (in other words, corresponds to a part of the region of the virtual space 200 to be displayed on the HMD 110). The visual field CV has a first region CVa set as an angular range of a polar angle α about the visual axis L in the xy plane in FIG. 7A, and a second region CVb set as an angular range of an azimuth β about the visual axis L in the xz plane in FIG. 7B. The control unit 121 may identify the line-of-sight direction of the user U based on data representing the line-of-sight direction of the user U, which is transmitted from the eye gaze sensor 140, and may determine the direction of the virtual camera 300 based on the line-of-sight direction of the user U.

The control unit 121 can identify the visual field CV of the virtual camera 300 based on the data transmitted from the position sensor 130 and/or the HMD sensor 114. In this case, when the user U wearing the HMD 110 moves, the control unit 121 can change the visual field CV of the virtual camera 300 based on the data representing the movement of the HMD 110, which is transmitted from the position sensor 130 and/or the HMD sensor 114. That is, the control unit 121 can change the visual field CV in accordance with the movement of the HMD 110. Similarly, when the line-of-sight direction of the user U changes, the control unit 121 may move the visual field CV of the virtual camera 300 based on the data representing the line-of-sight direction of the user U, which is transmitted from the eye gaze sensor 140. That is, the control unit 121 may change the visual field CV in accordance with the change in the line-of-sight direction of the user U.

In Step S3, the control unit 121 generates visual-field image data representing the visual-field image V to be displayed on the display unit 112 of the HMD 110. Specifically, the control unit 121 generates the visual-field image data based on the virtual space data for defining the virtual space 200 and the visual field CV of the virtual camera 300.

In Step S4, the control unit 121 displays the visual-field image V on the display unit 112 of the HMD 110 based on the visual-field image data (refer to FIG. 7A and FIG. 7B). The visual field CV of the virtual camera 300 changes in accordance with the movement of the user U wearing the HMD 110, and hence the visual-field image V to be displayed on the display unit 112 of the HMD 110 changes as well. Thus, the user U can be immersed in the virtual space 200.

The virtual camera 300 may include a left-eye virtual camera and a right-eye virtual camera. In this case, the control unit 121 generates left-eye visual-field image data representing a left-eye visual-field image based on the virtual space data and the visual field of the left-eye virtual camera. Further, the control unit 121 generates right-eye visual-field image data representing a right-eye visual-field image based on the virtual space data and the visual field of the right-eye virtual camera. The control unit 121 displays the left-eye visual-field image on a left-eye display unit based on the left-eye visual-field image data, and displays the right-eye visual-field image on a right-eye display unit based on the right-eye visual-field image data. In this manner, the user U can visually recognize the visual-field image three-dimensionally owing to parallax between the left-eye visual-field image and the right-eye visual-field image. The virtual camera may be arranged at a position of the eye of the avatar operated by the user as described later. For example, the left-eye virtual camera may be arranged at the left eye of the avatar, while the right-eye virtual camera may be arranged at the right eye of the avatar.

Figure 9:
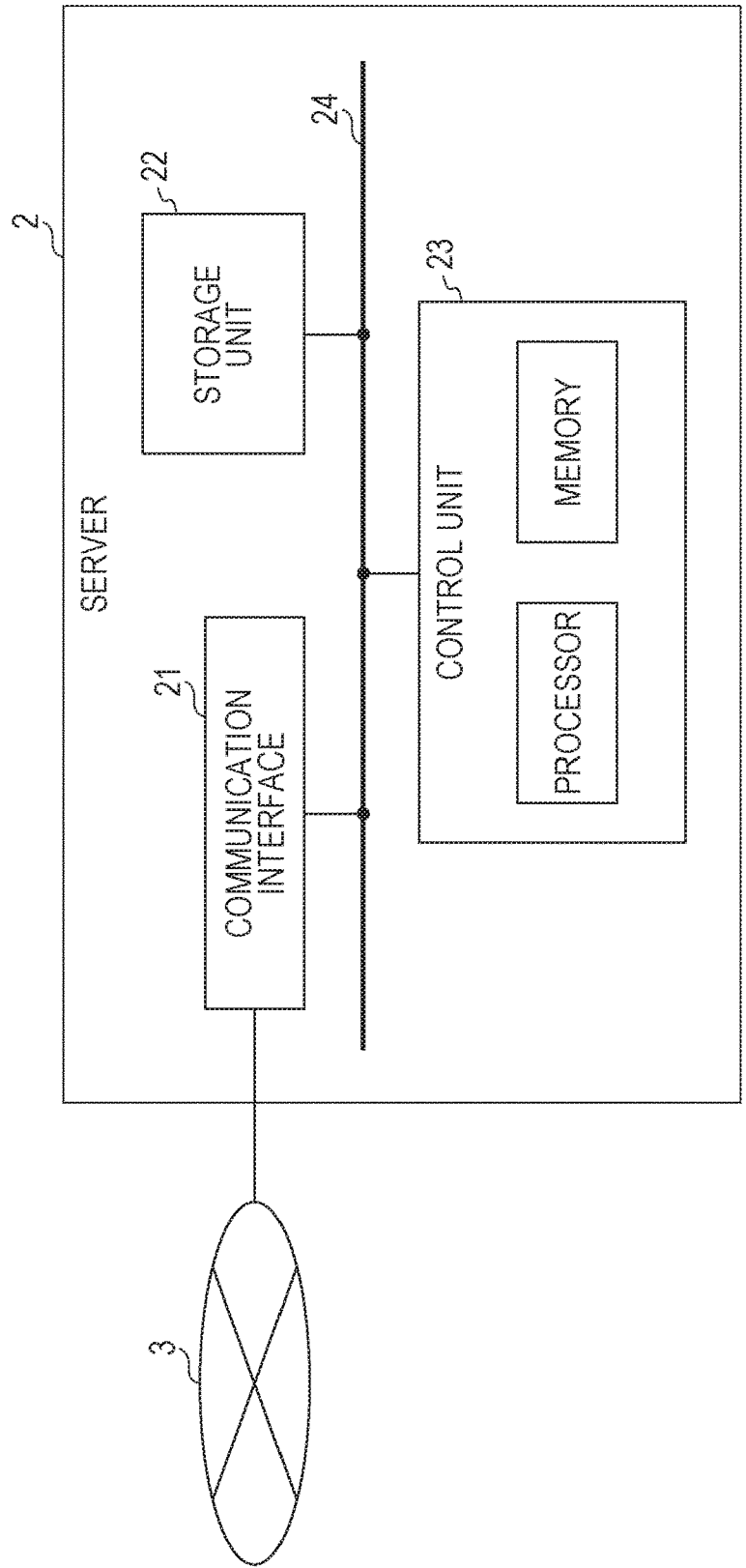
FIG. 9 is a diagram of a hardware configuration of a server according to at least one embodiment of this disclosure.

A hardware configuration of the server 2 in FIG. 1 is described with reference to FIG. 9. FIG. 9 is a diagram of the hardware configuration of the server 2 according to at least one embodiment. In FIG. 9, the server 2 includes a control unit 23, a storage unit 22, a communication interface 21, and a bus 24. The control unit 23, the storage unit 22, and the communication interface 21 are connected to one another through the bus 24 so as to enable communication therebetween. The control unit 23 includes a memory and a processor. The memory is formed of, for example, a ROM and a RAM, and the processor is formed of, for example, a CPU, an MPU and/or a GPU.

The storage unit (storage) 22 is, for example, a large capacity HDD. The storage unit 22 may store a control program for causing a computer to execute at least a part of the information processing method according to at least one embodiment, or a control program for achieving a social VR. The storage unit 22 may store user management information for managing each user, various images, and data relating to objects (for example, a virtual room and an avatar). The storage unit 22 may also store a video content charge table and a billing table, which are shown in FIG. 16, as databases. The communication interface 21 is configured to connect the server 2 to the communication network 3.

Figure 10A:
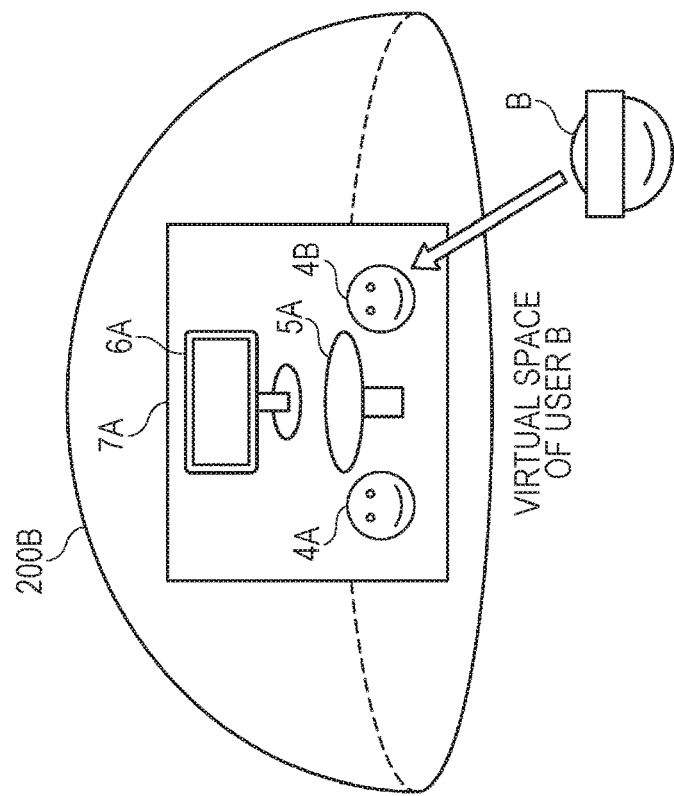
FIG. 10A is a diagram of the virtual space provided to a user A according to at least one embodiment of this disclosure.
Figure 10B:
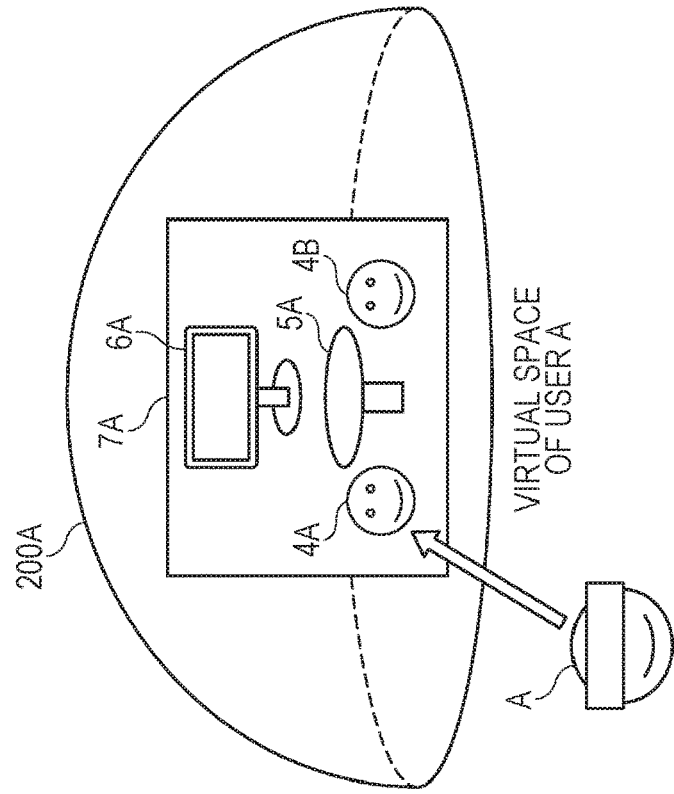
FIG. 10B is a diagram of the virtual space provided to a user B according to at least one embodiment of this disclosure.
Figure 11:
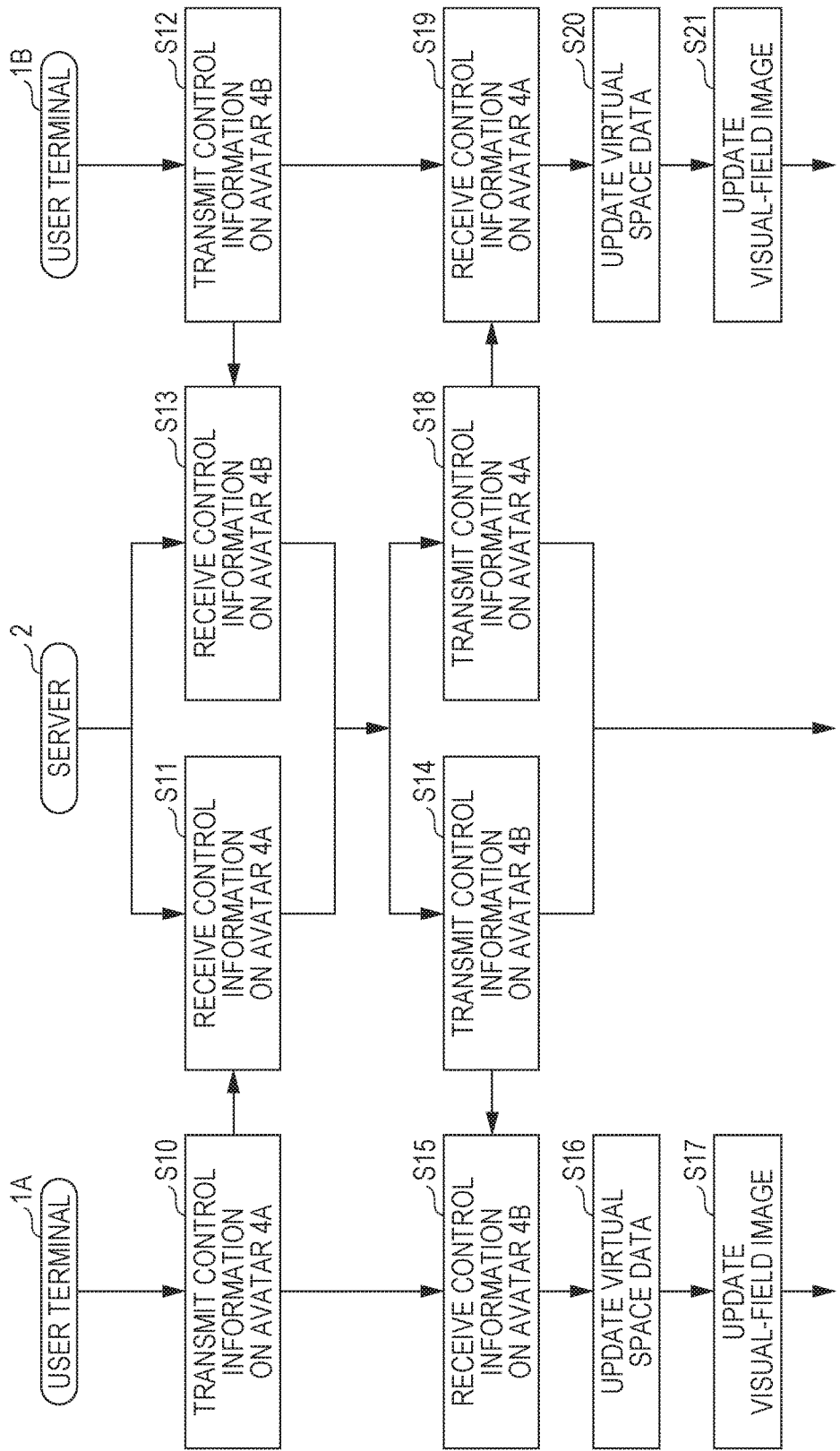
FIG. 11 is a sequence diagram of processing for synchronizing movements of respective avatars between user terminals according to at least one embodiment of this disclosure.

With reference to FIG. 1, FIG. 10, and FIG. 11, a description is given of processing for synchronizing movements of respective avatars 4A and 4B between the user terminal 1A and the user terminal 1B according to at least one embodiment. FIG. 10A is a diagram of a virtual space 200A provided to the user A according to at least one embodiment. FIG. 10B is a diagram of a virtual space 200B provided to the user B according to at least one embodiment. FIG. 11 is a sequence diagram of the processing for synchronizing the movements of the respective avatars 4A and 4B between the user terminal 1A and the user terminal 1B according to at least one embodiment. In this description, the avatar 4A associated with the user terminal 1A (user A) and the avatar 4B associated with the user terminal 1B (user B) are arranged in a virtual room 7A of the avatar 4A. That is, the user A and the user B share one virtual room 7A via the network 3 after the user B visits the virtual room 7A of the user A. One of ordinary skill in the art would understand that variations are possible, such as user A visiting the virtual room of user B, multiple users visiting the virtual room 7A of user A, etc.

In FIG. 10A, the virtual space 200A of the user A includes the avatar 4A, the avatar 4B, and the virtual room 7A in which the avatars 4A and 4B are arranged. The avatar 4A is operated by the user A, and is configured to move in association with the action of the user A. The avatar 4B is operated by the user B, and is configured to move in association with the action of the user B. For example, a position of the avatar 4A (4B) may be identified based on a position of the HMD 110 of the user A (user B). In the same manner, a direction of a face of the avatar 4A (4B) may be identified based on an inclination of the HMD 110 of the user A (user B). In addition, an action of a hand of the avatar 4A (4B) may be identified based on the actions of the external controllers. A line of sight (for example, a position of the iris and pupil) of the avatar 4A (4B) may be identified based on the line-of-sight direction of the user A (user B) detected by the eye gaze sensor 140. The virtual camera 300 in FIG. 6 may be arranged at the eye of the avatar 4A (4B). Specifically, the left-eye virtual camera may be arranged at the left eye of the avatar 4A (4B), while the right-eye virtual camera may be arranged at the right eye of the avatar 4A (4B). In the following description, it is assumed that the virtual camera 300 is arranged at the eyes of the avatar 4A (4B).

The virtual room 7A includes a virtual table 5A and a virtual screen 6A configured to display video content (moving image). The user A (B) can enjoy the video content displayed on the virtual screen 6A through the visual-field image displayed on the HMD 110. The user A may possess different kinds of virtual rooms to be arranged in the virtual space 200A. A plurality of virtual rooms possessed by the user A may be stored in, for example, the storage unit 123 of the user terminal 1A or the storage unit 22 of the server 2. For example, the user A can change a predetermined virtual room arranged in the virtual space to another virtual room.

In FIG. 10B, the virtual space 200B of the user B includes the avatar 4A, the avatar 4B, and the virtual room 7A in which the avatars 4A and 4B are arranged. Before the avatar 4B visits the virtual room 7A of the avatar 4A, a virtual room of the avatar 4B is arranged in the virtual space 200B.

With reference to FIG. 11, in Step S10, the control unit 121 of the user terminal 1A generates control information on the avatar 4A, and then transmits the generated control information on the avatar 4A to the server 2. The control unit 23 of the server 2 receives the control information on the avatar 4A from the user terminal 1A (Step S11). In this case, the control information on the avatar 4A represents information required for controlling the action of the avatar 4A, and includes, for example, information relating to the position of the avatar 4A, information relating to the direction of the face of the avatar 4A, information relating to the action of the hand of the avatar 4A, and information relating to the line of sight of the avatar 4A.

In Step S12, the control unit 121 of the user terminal 1B generates control information on the avatar 4B, and then transmits the generated control information on the avatar 4B to the server 2. The control unit 23 of the server 2 receives the control information on the avatar 4B from the user terminal 1B (Step S13). In this case, the control information on the avatar 4B represents information required for controlling the action of the avatar 4B, and includes, for example, information relating to the position of the avatar 4B, information relating to the direction of the face of the avatar 4B, information relating to the action of the hand of the avatar 4B, and information relating to the line of sight of the avatar 4B.

The server 2 transmits the control information on the avatar 4B to the user terminal 1A (Step S14) while transmitting the control information on the avatar 4A to the user terminal 1B (Step S18). After receiving the control information on the avatar 4B in Step S15, the control unit 121 of the user terminal 1A updates the virtual space data representing the virtual space 200A in FIG. 10A based on the control information on the avatars 4A and 4B (Step S16). For example, when the avatars 4A and 4B move, the virtual space data representing the virtual space including the avatars 4A and 4B that have moved and the virtual room 7A is generated. The control unit 121 of the user terminal 1A identifies the visual field CV of the virtual camera 300, which is illustrated in FIG. 7, based on the position and the inclination of the HMD 110, and then updates the visual-field image displayed on the HMD 110 based on the updated virtual space data and the visual field CV of the virtual camera 300 (Step S17).

After receiving the control information on the avatar 4A in Step S19, the control unit 121 of the user terminal 1B updates the virtual space data representing the virtual space 200B in FIG. 10B based on the control information on the avatars 4A and 4B (Step S20). The control unit 121 of the user terminal 1B identifies the visual field CV of the virtual camera 300 based on the position and the inclination of the HMD 110, and then updates the visual-field image displayed on the HMD 110 based on the updated virtual space data and the visual field CV of the virtual camera 300 (Step S21).

In at least one embodiment, after the user terminals 1A and 1B transmit the control information on the avatar 4A and the control information on the avatar 4B, respectively, to the server 2, the server 2 transmits the control information on the avatar 4A to the user terminal 1B, and transmits the control information on the avatar 4B to the user terminal 1A. The movements of the respective avatars 4A and 4B can be synchronized between the user terminal 1A and the user terminal 1B. The respective processing steps in FIG. 11 may be executed for every frame.

In a case of synchronizing the movements of the respective avatars 4A to 4C among the user terminals 1A to 1C, the user terminal 1A transmits the control information on the avatar 4A to the server 2, the user terminal 1B transmits the control information on the avatar 4B to the server 2, and the user terminal 1C transmits control information on the avatar 4C to the server 2. The server 2 transmits the control information on the avatars 4A and 4C to the user terminal 1B, transmits the control information on the avatars 4B and 4C to the user terminal 1A, and transmits the control information on the avatars 4A and 4B to the user terminal 1C.

Figure 12A:
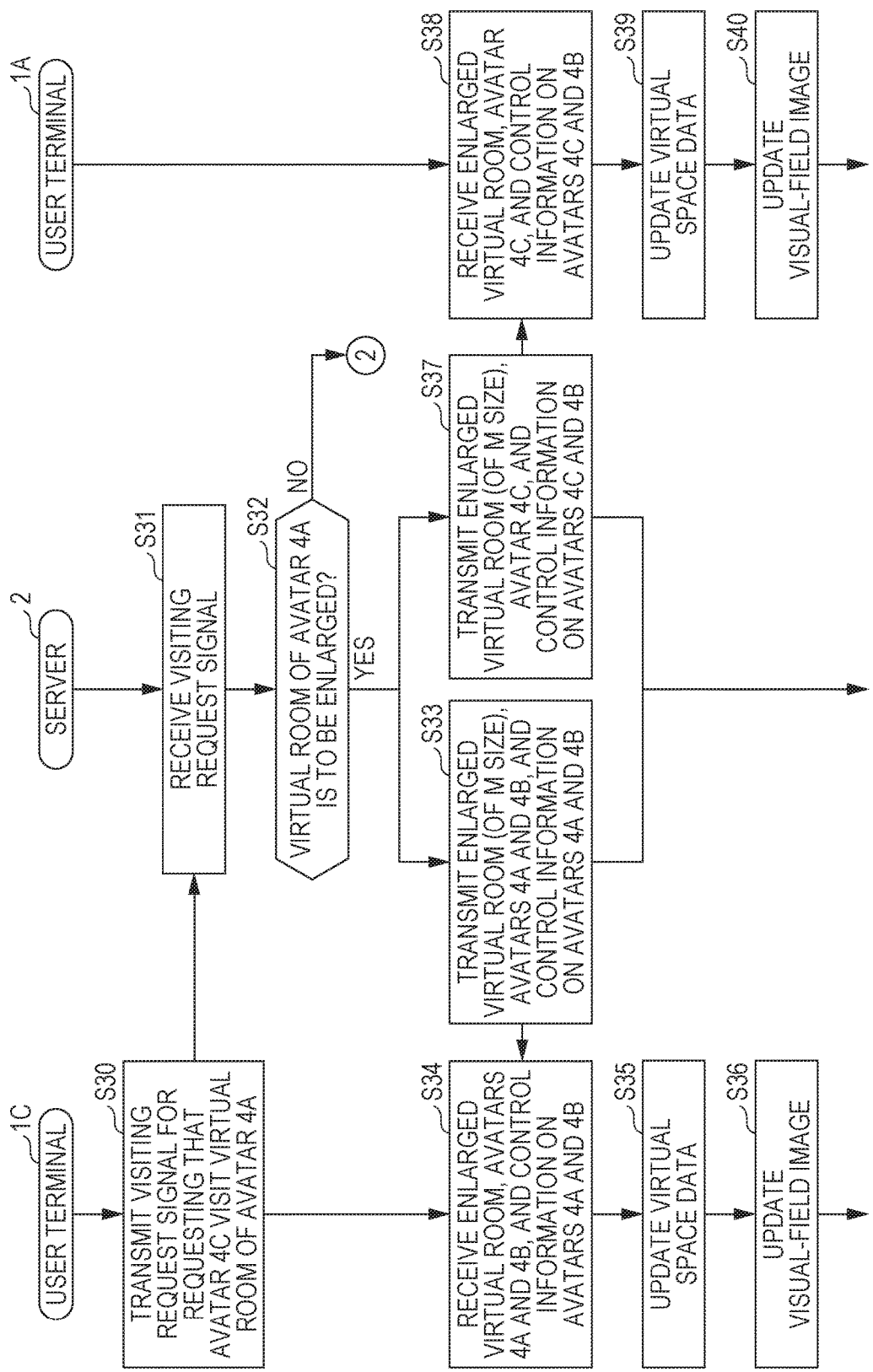
FIG. 12A is a sequence diagram of an information processing method according to at least one embodiment.

With reference to FIG. 12A to FIG. 14, a description is given of the information processing method according to at least one embodiment. FIG. 12A is a sequence diagram of the information processing method according to at least one embodiment. FIG. 12B is a sequence diagram continuing from the information processing method of FIG. 12A according to at least one embodiment. FIG. 13A is a diagram of the virtual space 200A provided to the user A (before a visit of the avatar 4C) according to at least one embodiment. FIG. 13B is a diagram of a virtual space 200C of the user C (before the visit of the avatar 4C) according to at least one embodiment. FIG. 14A is a diagram of the virtual room of the avatar 4A, which has been enlarged by the visit of the avatar 4C to the virtual room of the avatar 4A according to at least one embodiment. FIG. 14B is a diagram of the virtual space of the avatar 4C, which has been updated by the visit of the avatar 4C to the virtual room of the avatar 4A according to at least one embodiment.

In this description, the avatar 4A and the avatar 4B are arranged in the virtual room 7A of the avatar 4A. That is, the avatar 4B has visited the virtual room 7A of the avatar 4A. The avatar 4C associated with the user terminal 1C (user C) is arranged in a virtual room 7C of the avatar 4C. The avatar 4C is to visit the virtual room 7A of the user A. One of ordinary skill in the art understand that variations are possible.

Figure 13B:
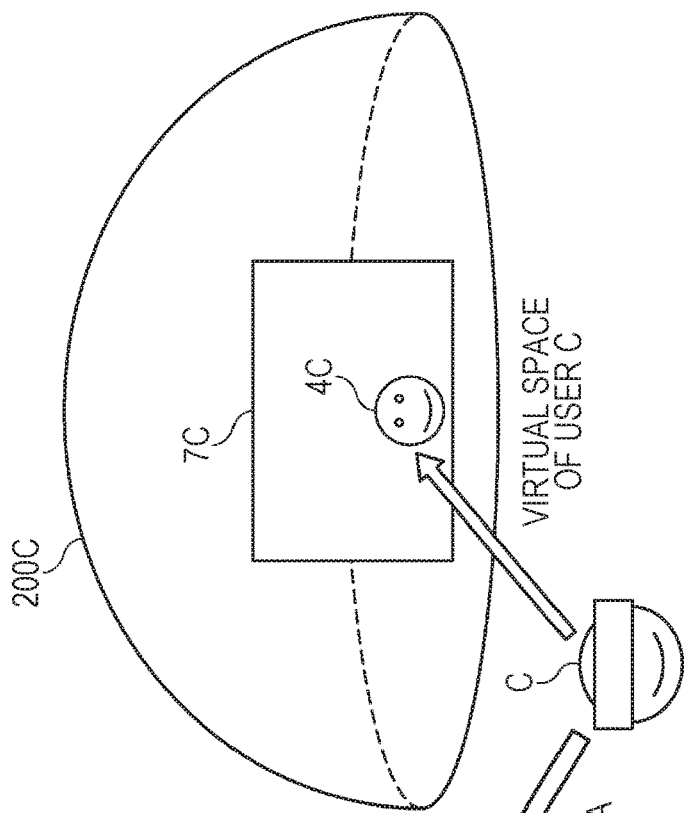
FIG. 13B is a diagram of the virtual space provided to a user C according to at least one embodiment of this disclosure.
Figure 13A:
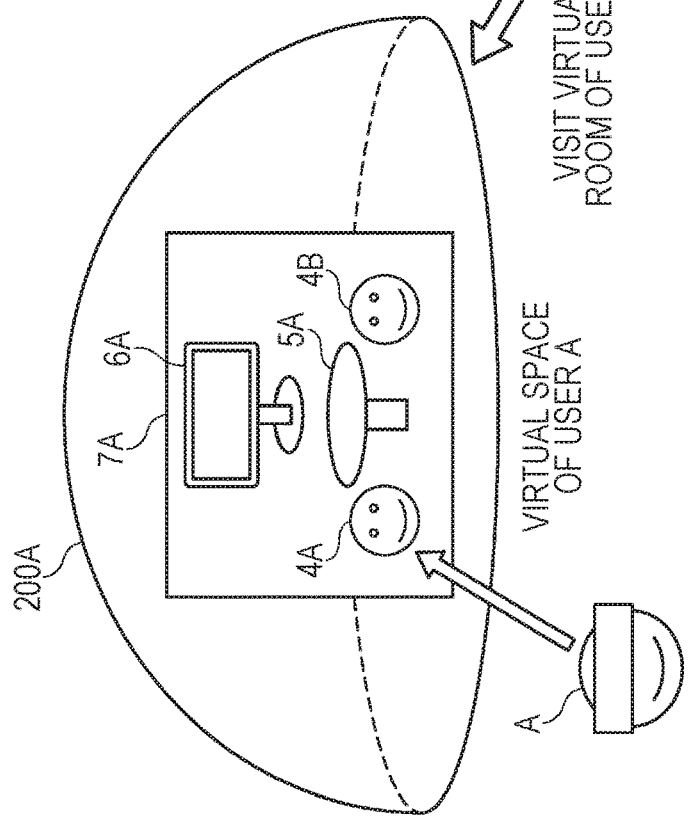
FIG. 13A is a diagram of the virtual space provided to the user A according to at least one embodiment of this disclosure.

In FIG. 13A, the virtual space 200A of the user A (first virtual space) includes the avatar 4A (first avatar) associated with the user terminal 1A (first user terminal), the avatar 4B associated with the user terminal 1B, and the virtual room 7A (first virtual room). As described above, the avatar 4A is operated by the user A (first user), and is configured to move in association with the action of the user A. The avatar 4B is operated by the user B, and is configured to move in association with the action of the user B. The virtual room 7A includes the virtual table 5A and the virtual screen 6A (first virtual screen). A size of the virtual room 7A is a small (s) size. The virtual space data (first virtual space data) representing the virtual space 200A is generated by the control unit 121 of the user terminal 1A.

In FIG. 13B, the virtual space 200C of the user C includes the avatar 4C (second avatar) associated with the user terminal 1C (second user terminal) and the virtual room 7C where the avatar 4C is arranged. The avatar 4C is operated by the user C (second user), and is configured to move in association with the action of the user C. The virtual space data representing the virtual space 200C is generated by the control unit 121 of the user terminal 1C.

With reference to FIG. 12A, in Step S30, the user C executes predetermined operation input for visiting the virtual room 7A of the avatar 4A. For example, the user C selects an item "Visit the virtual room of the avatar 4A" or other such item within the menu screen displayed on the HMD 110. The control unit 121 of the user terminal 1C generates a visiting request signal for requesting that the avatar 4C visit the virtual room 7A of the avatar 4A based on the operation input received from the user C, and then transmits the visiting request signal to the server 2.

In Step S31, the control unit 23 of the server 2 receives the visiting request signal from the user terminal 1C. The control unit 23 determines whether or not to update the virtual room 7A, that is, to enlarge the virtual room 7A, based on a total number N of avatars currently arranged in the virtual room 7A and avatars that are to visit the virtual room 7A (Step S32). A relationship between the total number N of avatars currently arranged in the virtual room and avatars that are to visit the virtual room and the size of the virtual room is, for example, as follows.

[Table 1]

TABLE 1

Relationship between total number N of avatars and size of virtual room

| Total number N of avatars | Size of virtual room |
| --- | --- |
| 1 ≤ N < 3 | Small (S) size |
| 3 ≤ N < 6 | Medium (M) size |
| 6 ≤ N | Large (L) size |

A table indicating a relationship between the total number N of avatars and the size of the virtual room, which is shown in Table 1, may be stored in the storage unit 22 of the server 2. In at least one embodiment, the number of avatars currently arranged in the virtual room 7A is two (avatars 4A and 4B), while the number of avatars that are to visit the virtual room 7A is one (avatar 4C), and hence the control unit 23 identifies the total number N of avatars as three. The control unit 23 determines that the size of the virtual room of the avatar 4A is to be changed from the S size to a medium (M) size, that is, the size of the virtual room of the avatar 4A is to be enlarged, based on the total number N of avatars being three and the table indicating the relationship between the total number N of avatars and the size of the virtual room (YES in Step S32).

The control unit 23 acquires a virtual room 70A of the M size, in FIG. 14, from the storage unit 22, and then transmits the virtual room 70A of the M size (enlarged first virtual room), the avatars 4A and 4B, and the control information on the avatars 4A and 4B to the user terminal 1C (Step S33). Although not shown in FIG. 12, the server 2 is assumed to acquire the control information on the avatars 4A to 4C for every frame. The virtual room 7A is a virtual room of the S size of the avatar 4A, and the virtual room 70A is a virtual room of the M size of the avatar 4A.

Figure 14A:
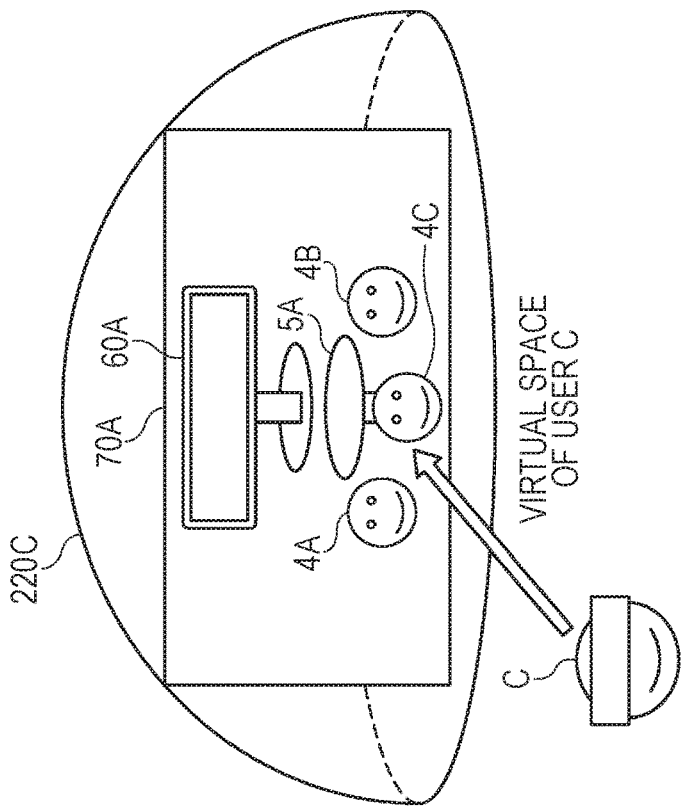
FIG. 14A is a diagram of a virtual room of an avatar of the user A, which has been enlarged according to at least one embodiment of this disclosure.
Figure 14B:
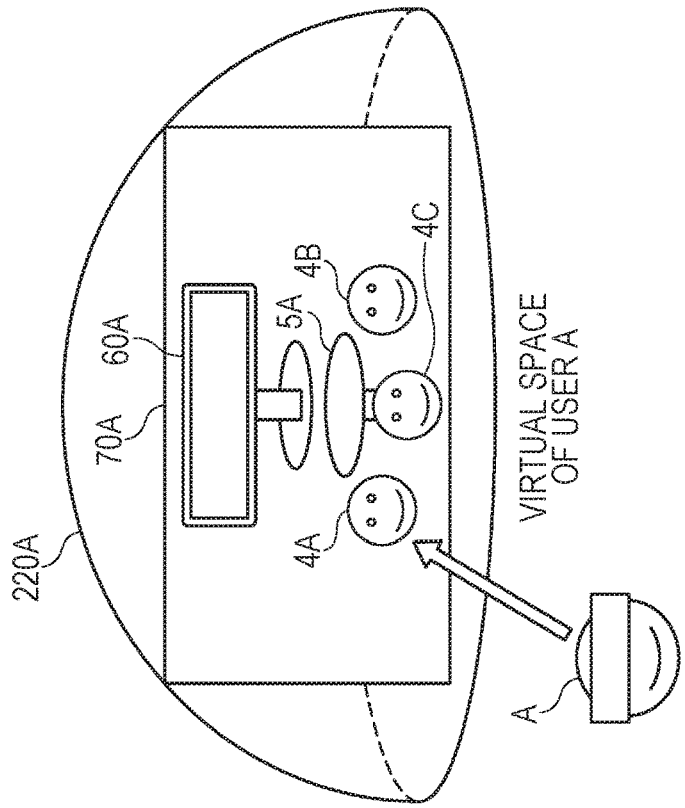
FIG. 14B is a diagram of the virtual space of an avatar of the user C, which has been updated according to at least one embodiment of this disclosure.

In Step S34, the control unit 121 of the user terminal 1C receives the virtual room 70A, the avatars 4A and 4B, and the control information on the avatars 4A and 4B. The control unit 121 updates the virtual space data representing the virtual space 200C in FIG. 13B based on the virtual room 70A, the avatars 4A to 4C, and the control information on the avatars 4A to 4C (Step S35). Specifically, the control unit 121 generates the virtual space data representing the virtual space 220C in FIG. 14B. In FIG. 14B, the virtual space 220C includes the avatars 4A, 4B, and 4C and the virtual room 70A. The virtual room 70A includes the virtual table 5A and a virtual screen 60A (enlarged first virtual screen).

The control unit 121 of the user terminal 1C identifies the visual field CV of the virtual camera 300, in FIG. 7, based on the position and the inclination of the HMD 110, and then updates the visual-field image displayed on the HMD 110 based on the updated virtual space data and the visual field CV of the virtual camera 300 (Step S36). When the user C executes the predetermined operation input for visiting the virtual room 7A of the avatar 4A, the virtual space to be presented to the user C is changed from the virtual space 200C including the virtual room 7C, in FIG. 13B, to the virtual space 220C including the virtual room 70A of the avatar 4A, in FIG. 14B, and hence the avatar 4C can visit the virtual room of the avatar 4A.

In Step S37, the control unit 23 transmits the virtual room 70A of the M size (enlarged first virtual room), the avatar 4C, and the control information on the avatars 4C and 4B to the user terminal 1A. In Step S38, the control unit 121 of the user terminal 1A receives the virtual room 70A, the avatar 4C, and the control information on the avatars 4C and 4B. The control unit 121 updates the virtual space data representing the virtual space 200A in FIG. 13A based on the virtual room 70A, the avatars 4A to 4C, and the control information on the avatars 4A to 4C (Step S39). Specifically, the control unit 121 generates the virtual space data representing a virtual space 220A in FIG. 14A. In FIG. 14A, the virtual space 220A includes the avatars 4A, 4B, and 4C and the virtual room 70A. The virtual room 70A includes the table 5A and the virtual screen 60A (enlarged first virtual screen).

In FIG. 13A and FIG. 14A, when the virtual room of the avatar 4A is updated from the virtual room 7A to the virtual room 70A so that the size of the virtual room of the avatar 4A is enlarged, a virtual screen for displaying the video content is also updated from the virtual screen 6A (of the S size) to the virtual screen 60A (of the M size). That is, the size of the virtual screen arranged in the virtual room is also enlarged based on the enlargement of the size of the virtual room. As the total number N of avatars increases, the size of the virtual room is further enlarged, and the size of the virtual screen is also enlarged, which can encourage a large number of users (avatars) to enjoy viewing the same video content displayed on the virtual screen within the same virtual room. Therefore, one user is encouraged to visit the virtual room of another user (social VR). As the size of the virtual room is enlarged, the size of furniture (for example, table) arranged in the virtual room may also be enlarged.

In FIG. 13A and FIG. 14A, the avatars 4A and 4B are arranged in the virtual room 70A so that a relative positional relationship between the avatars 4A and 4B and the virtual room 7A is maintained. Specifically, relative positions of the avatars 4A and 4B with respect to a center of the virtual room 70A (or a coordinate space set for the virtual room 70A) are substantially the same as relative positions of the avatars 4A and 4B with respect to a center of the virtual room 7A (or a coordinate space set for the virtual room 7A). A point of view of the user A (position of the avatar 4A at which the virtual camera is arranged) is prevented from being greatly changed before and after the virtual room of the avatar 4A is updated from the virtual room 7A to the virtual room. 70A, which can suitably prevent the user A from suffering from VR sickness. The avatar 4C that is to visit the virtual room of the avatar 4A may be arranged at a predetermined position (in this example, a predetermined position between the avatar 4A and the avatar 4B) within the virtual room 70A.

Returning to FIG. 12A, the control unit 121 of the user terminal 1A identifies the visual field CV of the virtual camera 300, which is illustrated in FIG. 7, based on the position and the inclination of the HMD 110, and then updates the visual-field image displayed on the HMD 110 based on the updated virtual space data and the visual field CV of the virtual camera 300 (Step S40).

In FIG. 12A, only operation processing of the server 2 and the user terminals 1A and 1C is included for simplicity in description, but one of ordinary skill in the art would understand that the server 2 also transmits the virtual room 70A, the avatar 4C, and the control information on the avatars 4C and 4A to the user terminal 1B. In short, the virtual space provided to the user B is updated as well. The updated virtual space includes the table 5A, the virtual room 70A including the virtual screen 60A, and the avatars 4A to 4C.

Figure 12B:
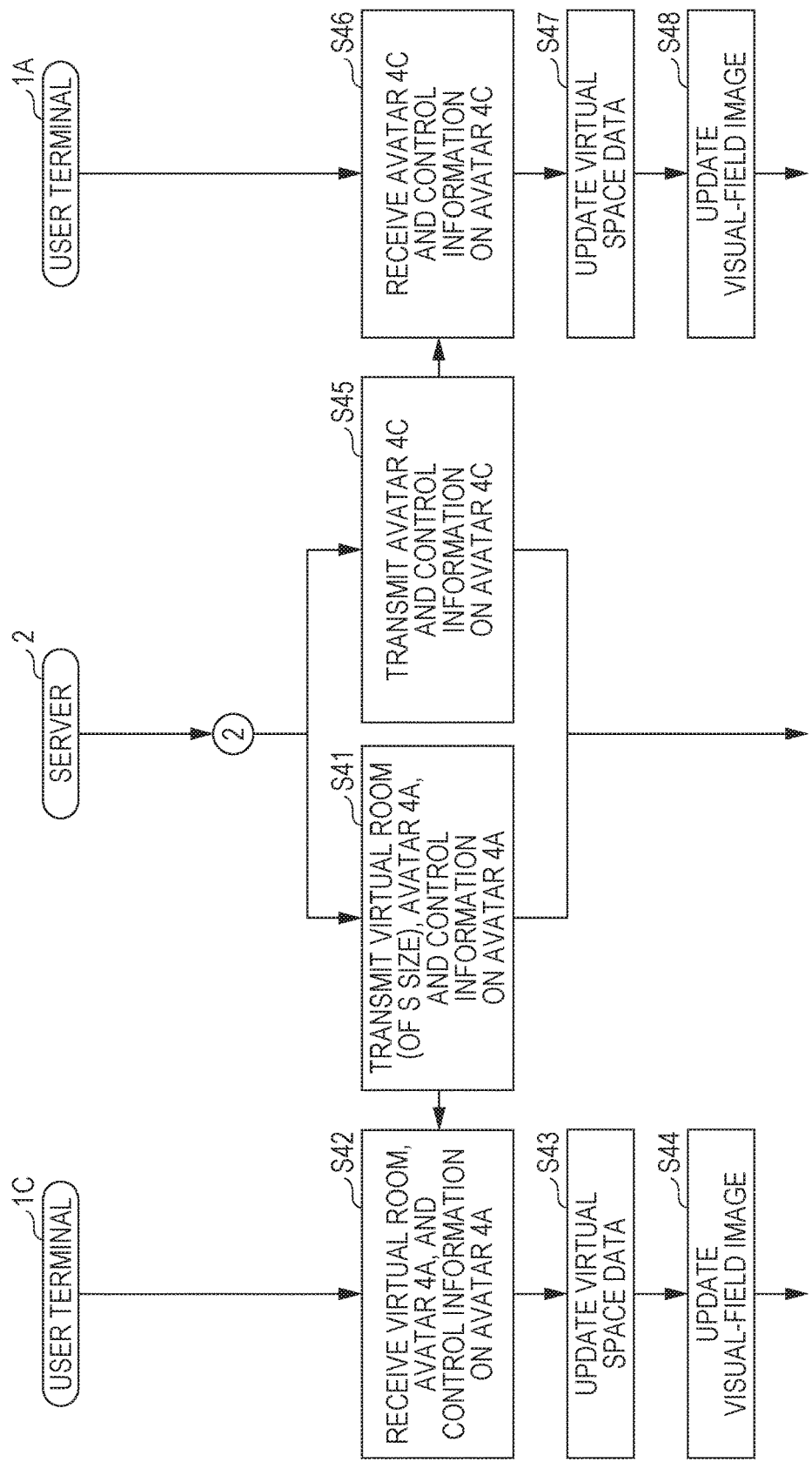
FIG. 12B is a sequence diagram of the information processing method according to at least one embodiment continued from FIG. 12A.

With reference to FIG. 12B, a description is given of processing performed to determine that the size of the virtual room of the avatar 4A is not to be enlarged (NO in Step S32). For example, as a precondition that, when the avatar 4B is not present in the virtual room 7A of the user A, the control unit 23 of the server 2 identifies the total number N of avatars as two. Then, the control unit 23 determines that the size of the virtual room of the avatar 4A is not to be enlarged based on the total number N of avatars being two and the table indicating the relationship between the total number N of avatars and the size of the virtual room, which is shown in Table 1 (NO in Step S32). The control unit 23 transmits the virtual room 7A of the S size (first virtual room), the avatar 4A, and the control information on the avatar 4A to the user terminal 1C (Step S41).

After receiving the virtual room 7A, the avatar 4A, and the control information on the avatar 4A, the control unit 121 of the user terminal 1C updates the virtual space data based on the virtual room 7A, the avatars 4A and 4C, and the control information on the avatars 4A and 4C (Step S43). Specifically, the control unit 121 generates the virtual space data representing the virtual space including the avatars 4A and 4C and the virtual room 7A. The control unit 121 updates the visual-field image displayed on the HMD 110 based on the updated virtual space data and the visual field CV of the virtual camera 300 (Step S44).

In Step S45, the control unit 23 transmits the avatar 4C and the control information on the avatar 4C to the user terminal 1A. In Step S46, the control unit 121 of the user terminal 1A receives the avatar 4C and the control information on the avatar 4C. The control unit 121 updates the virtual space data based on the virtual room 7A, the avatars 4A and 4C, and the control information on the avatars 4A and 4C (Step S47). Specifically, the control unit 121 generates the virtual space data representing the virtual space including the avatars 4A and 4C and the virtual room 7A. The control unit 121 updates the visual-field image displayed on the HMD 110 based on the updated virtual space data and the visual field CV of the virtual camera 300 (Step S48). A series of processing of at least one embodiment is executed.

According to at least one embodiment, a determination is made whether or not to update the virtual room of the avatar 4A based on the total number N of avatars currently arranged in the virtual room 7A of the avatar 4A and avatars that are to visit the virtual room 7A, and in response to a determination that the virtual room of the avatar 4A is to be updated, the virtual room of the avatar 4A is updated from the virtual room 7A (of the S size) to the virtual room 70A (of the M size). The size of the virtual room is enlarged based on the total number N of avatars, which can prevent a situation unpleasant for the respective users A to C in which a large number of avatars are arranged in the virtual room 7A of the S size. Therefore, the information processing method is capable of improving a virtual experience of the user within the social VR.

When the avatar 4C leaves the virtual room 70A under a state under which the avatars 4A, 4B, and 4C are arranged in the virtual room 70A, the virtual room of the avatar 4A may be updated from the virtual room 70A of the M size to the virtual room 7A of the S size. That is, the size of the virtual room of the avatar 4A may be reduced based on the total number N of avatars.

The relationship between the total number N of avatars and the size of the virtual room, which is shown in Table 1, is merely an example, and the size of the virtual room may be gradually enlarged as the total number N of avatars increases one by one (or as avatars enter or exit the room in groups).

In at least one embodiment, the virtual space data and the visual-field image data are generated on the user terminals 1A to 1C, but may be generated on the server 2. In this case, the user terminals 1A to 1C each display the visual-field image on the HMD 110 based on the visual-field image data transmitted from the server 2.

Figure 15:
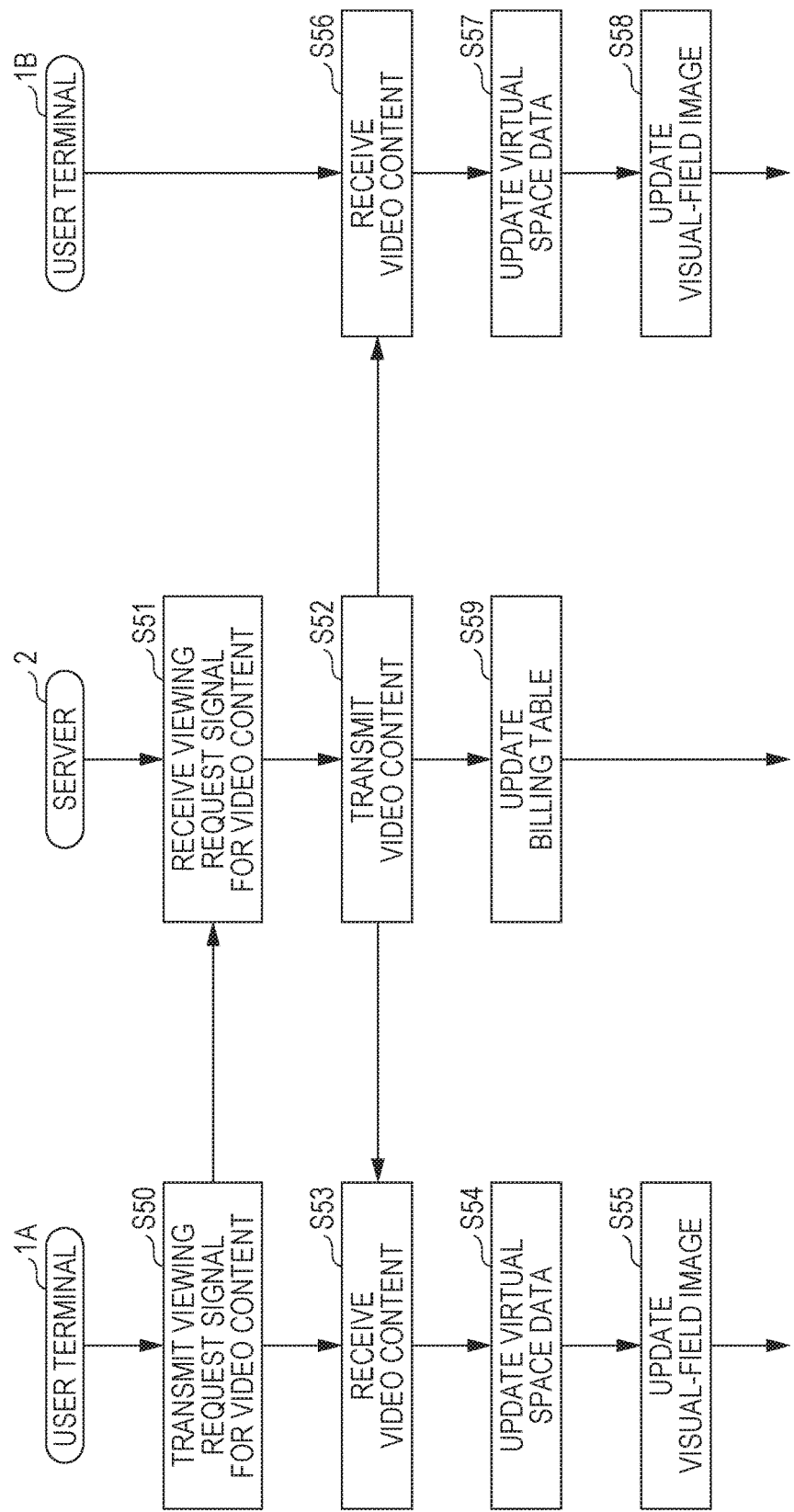
FIG. 15 is a sequence diagram of processing for viewing video content according to at least one embodiment of this disclosure.

With reference to FIG. 10, FIG. 15, and FIG. 16, a description is given of processing for viewing the video content displayed on the virtual screen 6A between the users A and B. FIG. 15 is a sequence diagram of the processing for viewing the video content according to at least one embodiment. FIG. 16A is a table of the video content charge table according to at least one embodiment. FIG. 16B is a table of the billing table according to at least one embodiment. In this description, in FIG. 10, the avatar 4A and the avatar 4B are arranged in the virtual room 7A of the avatar 4A. That is, the user A and the user B share one virtual room 7A via the communication network 3.

In FIG. 15, in Step S50, the user A executes predetermined operation input for viewing a video content item V1. For example, the user A selects an item "View the video content item V1" or other such item within the menu screen displayed on the HMD 110. The control unit 121 of the user terminal 1A generates a viewing request signal for requesting the viewing of the video content item V1 based on the operation input received from the user A, and then transmits the viewing request signal to the server 2.

The control unit 23 of the server 2 receives the viewing request signal from the user terminal 1A (Step S51). The control unit 23 acquires the video content item V1 from the storage unit (or a server arranged on the communication network 3 and configured to store the video content), and then transmits the acquired video content item V1 to the user terminals 1A and 1B (Step S52). The server 2 may transmit the time-divided video content item V1. In other words, the server 2 may distribute the video content item V1 through streaming.

The control unit 121 of the user terminal 1A receives the video content item V1 from the server 2 (Step S53). The control unit 121 updates the virtual space data based on the video content item V1, the virtual room 7A, and the avatars 4A and 4B (Step S54). Specifically, the control unit 121 displays the video content item V1 on the virtual screen 6A through texture mapping. The control unit 121 generates the virtual space data representing the virtual space 200A including the virtual screen 6A on which the video content item V1 is displayed. The control unit 121 updates the visual-field image displayed on the HMD 110 based on the updated virtual space data and the visual field CV of the virtual camera 300, in FIG. 7 (Step S55).

The control unit 121 of the user terminal 1B receives the video content item V1 from the server 2 (Step S56). The control unit 121 updates the virtual space data based on the video content item V1, the virtual room 7A, and the avatars 4A and 4B (Step S57). Specifically, the control unit 121 generates the virtual space data representing the virtual space 200B including the virtual screen 6A on which the video content item V1 is displayed. The control unit 121 updates the visual-field image displayed on the HMD 110 based on the updated virtual space data and the visual field CV of the virtual camera 300, which is illustrated in FIG. 7 (Step S58).

The control unit 23 of the server 2 updates the billing table stored in the storage unit 22, which is shown FIG. 16B (Step S59). Specifically, the control unit 23 refers to the video content charge table stored in the storage unit 22, in FIG. 16A, to identify a viewing unit price for the video content item V1 (in this example, the viewing unit price for the video content item V1 is 300 yen). The control unit 23 updates billing data on the users A and B within the billing table based on the viewing unit price for the video content item V1. In FIG. 16, the viewing unit price may differ depending on the kind of video content (in this example, the viewing unit price for a video content item V2 is 500 yen). In addition, when the video content is viewed by a plurality of avatars via one virtual room, a group discount may be applied for the viewing unit price for the video content. For example, when the video content item V1 is viewed by avatars whose number is equal to or larger than a predetermined number via one virtual room (for example, the virtual room 7A), the viewing unit price for the video content item V1 may be reduced from 300 yen to 200 yen. In the same manner, when the video content item V2 is viewed by the avatars whose number is equal to or larger than the predetermined number via one virtual room (for example, the virtual room 7A), the viewing unit price for the video content item V2 may be reduced from 500 yen to 300 yen.

Figure 17:
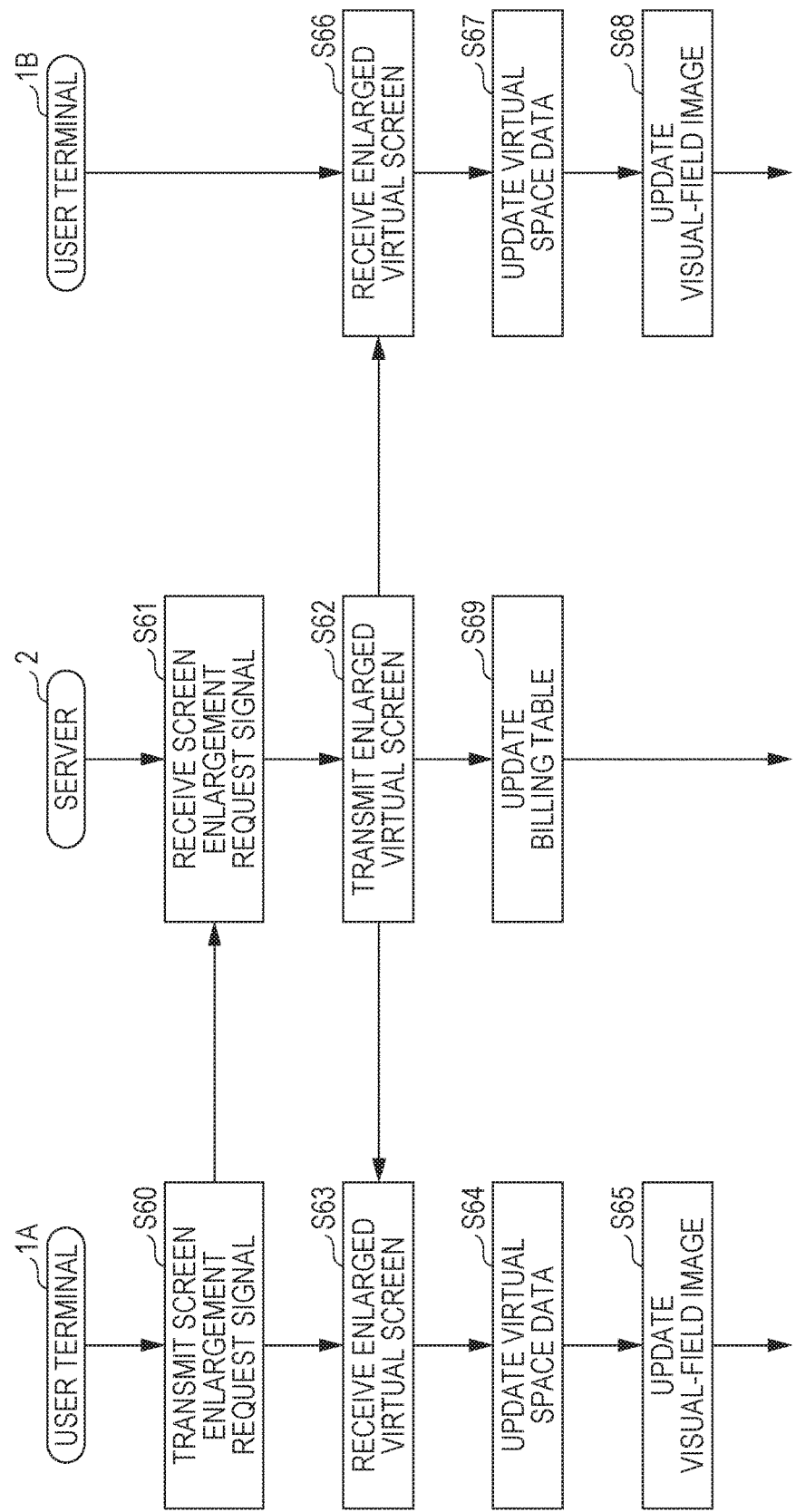
FIG. 17 is a sequence diagram of processing for enlarging a virtual screen according to at least one embodiment of this disclosure.

With reference to FIG. 17 and FIG. 18, a description is given of processing for enlarging the size of the virtual screen 6A (first virtual screen) without updating the size of the virtual room. FIG. 17 is a sequence diagram of the processing for enlarging the virtual screen 6A (specifically, processing for updating the virtual screen 6A of the S size to the virtual screen 60A of the M size (enlarged first virtual screen) according to at least one embodiment. FIG. 18A is a diagram of the virtual space 200A provided to the user A before the virtual screen 6A is enlarged according to at least one embodiment. FIG. 18B is a diagram of the virtual space 200A provided to the user A after the virtual screen 6A is enlarged according to at least one embodiment. In this description, in FIG. 18A, the avatar 4A and the avatar 4B are arranged in the virtual room 7A of the avatar 4A. That is, the user A and the user B share one virtual room 7A via the communication network 3.

In FIG. 17, in Step S60, the user A executes predetermined operation input for enlarging the virtual screen 6A. For example, the user A selects an item "enlarge the size of the virtual screen to the M size" or other such item within the menu screen displayed on the HMD 110. The control unit 121 of the user terminal 1A transmits a screen enlargement request signal for enlarging a size of the virtual screen 6A to the M size to the server 2 based on the operation input received from the user A.

The control unit 23 of the server 2 receives the screen enlargement request signal from the user terminal 1A (Step S61). The control unit 23 acquires the virtual screen 60A of the M size from the storage unit 22, and then transmits the virtual screen 60A (enlarged virtual screen) to the user terminals 1A and 1B (Step S62).

The control unit 121 of the user terminal 1A receives the virtual screen 60A from the server 2 (Step S63). The control unit 121 updates the virtual space data based on the virtual screen 60A, the virtual room 7A, and the avatars 4A and 4B (Step S64). Specifically, the control unit 121 updates the virtual screen from the virtual screen 6A of the S size to the virtual screen 60A of the M size, and then generates the virtual space data representing the virtual space 200A including: the virtual room 7A including the virtual screen 60A; and the avatars 4A and 4B. The control unit 121 updates the visual-field image displayed on the HMD 110 based on the updated virtual space data and the visual field CV of the virtual camera 300, in FIG. 7 (Step S65).

In Step S66, the control unit 121 of the user terminal 1B receives the virtual screen 60A from the server 2. The control unit 121 updates the virtual space data based on the virtual screen 60A, the virtual room 7A, and the avatars 4A and 4B (Step S67). Specifically, the control unit 121 updates the virtual screen from the virtual screen 6A of the S size to the virtual screen 60A of the M size, and then generates the virtual space data representing the virtual space. The virtual space includes the virtual room 7A including the virtual screen 60A; and the avatars 4A and 4B. The control unit 121 updates the visual-field image displayed on the HMD 110 based on the updated virtual space data and the visual field CV of the virtual camera 300, in FIG. 7 (Step S68).

In Step S69, the server 2 updates the billing table stored in the storage unit 22, which is shown in FIG. 16B. Specifically, the control unit 23 refers to the video content charge table, which is shown in FIG. 16A, to identify an additional charge (virtual screen enlargement charge) required for enlarging the size of the virtual screen to the M size based on a screen enlargement request. For example, when the video content being currently viewed is the video content item V1, the control unit 23 identifies the virtual screen enlargement charge required for enlarging the size of the virtual screen to the M size as 500 yen. The control unit 23 updates the billing data on the user A within the billing table based on the identified virtual screen enlargement charge (for example, 500 yen). In FIG. 16B, when the user A enlarges the size of the virtual screen to the M size through a predetermined operation while the users A and B are viewing the video content item V1 on the virtual screen 6A of the S size, an amount to be billed to the user A for the viewing of the video content item V1 is (300 yen (viewing unit price for the video content item V1))+(500 yen (virtual screen enlargement charge))=(800 yen). The virtual screen enlargement charge may be borne only by the user A who has requested for the enlargement of the virtual screen, or may be equally shared by the users A and B.

According to at least one embodiment, the virtual screen is updated so that the size of the virtual screen of the avatar 4A is enlarged to the M size based on the screen enlargement request signal, and a billing amount to be billed to the user A is updated. Even when there is no avatar that is to visit the virtual room 7A of the avatar 4A, the user A can enjoy viewing video content or other such moving image on a large virtual screen by paying a predetermined amount.

According to at least one embodiment, the billing amount billed to the user A when the size of the virtual screen is enlarged to the M size (from the virtual screen 6A to the virtual screen 60A) based on the enlargement of the size of the virtual room of the avatar 4A (from the virtual room 7A to the virtual room 70A) be smaller than the billing amount billed to the user A when the size of the virtual screen is enlarged to the M size based on the screen enlargement request signal. For example, the billing amount based on the enlargement of the virtual room is, for example, 0 yen. The billing amount based on the screen enlargement request signal is 500 yen as in FIG. 16A. The billing amount based on the enlargement of the virtual room is thus smaller than the billing amount based on the screen enlargement request signal, which can encourage a large number of users to enjoy viewing the same video content within the same virtual room. Therefore, one user is encouraged to visit the virtual room of another user (social VR).

Figure 19A:
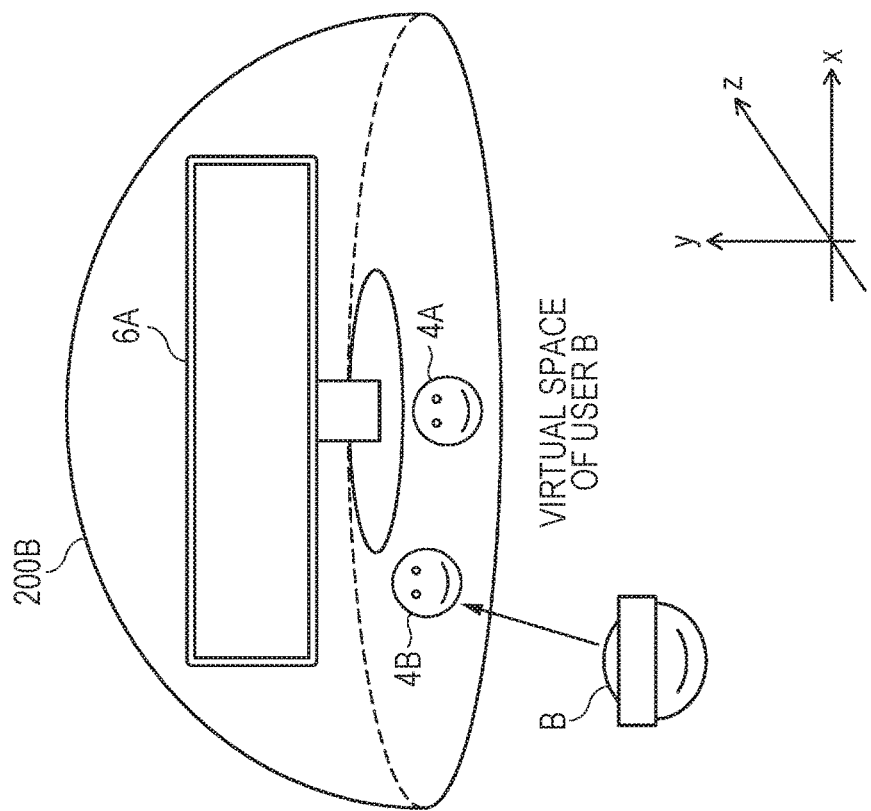
FIG. 19A is a diagram of the virtual space provided to the user A according to at least one embodiment of this disclosure.
Figure 19B:
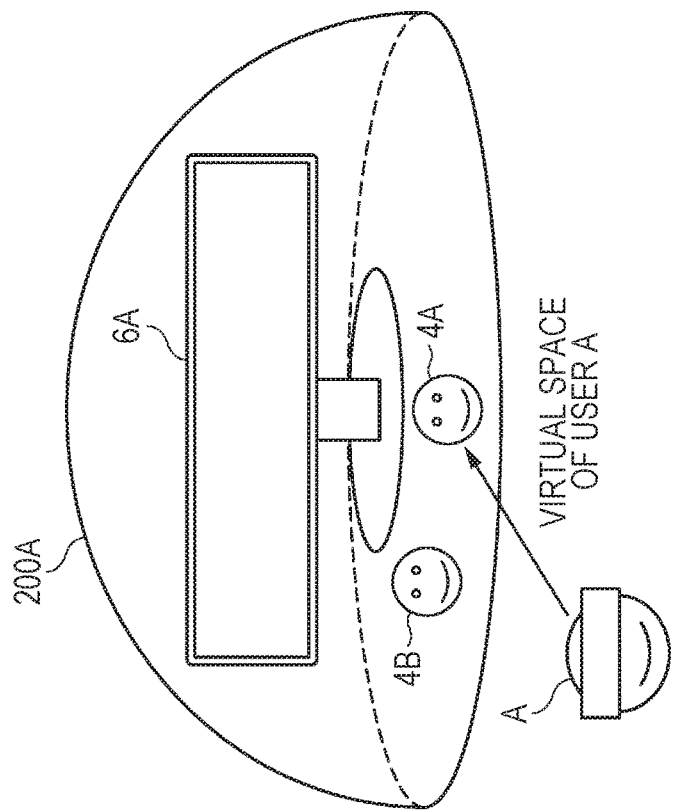
FIG. 19B is a diagram of the virtual space provided to the user B according to at least one embodiment of this disclosure.
Figure 20:
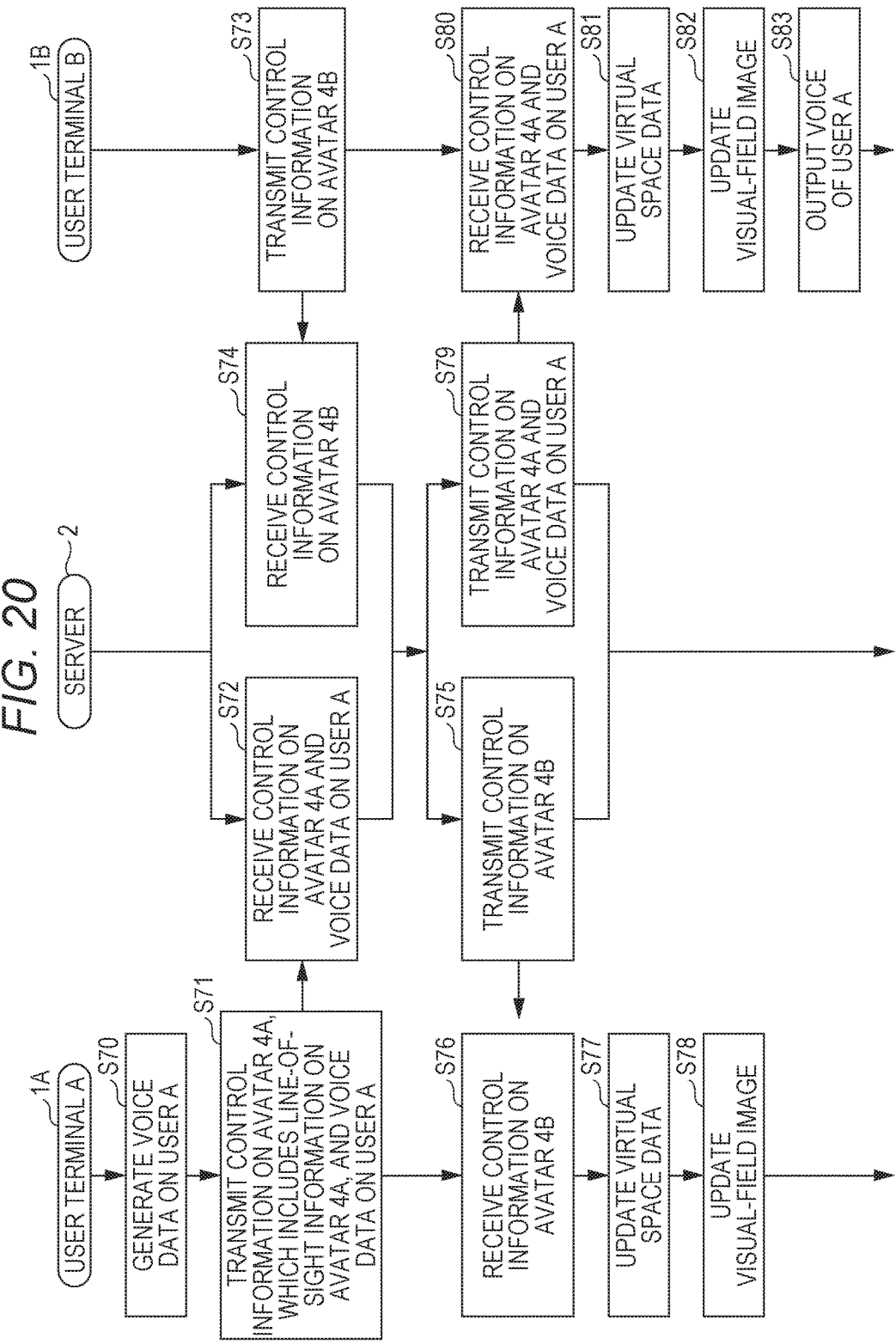
FIG. 20 is a sequence diagram of the processing for synchronizing the movements of the respective avatars between the user terminals according to at least one embodiment of this disclosure.

With reference to FIG. 19 and FIG. 20, a description is given of an example of the processing for synchronizing the movements of the respective avatars 4A and 4B between the user terminal 1A and the user terminal 1B. FIG. 19A is a diagram of the virtual space 200A provided to the user A according to at least one embodiment. FIG. 19B is a diagram of the virtual space 200B provided to the user B according to at least one embodiment. FIG. 20 is a sequence diagram of the processing for synchronizing the movements of the respective avatars 4A and 4B between the user terminal 1A and the user terminal 1B according to at least one embodiment. In this description, in FIGS. 19A-B, the avatar 4A associated with the user terminal 1A (user A) and the avatar 4B associated with the user terminal 1B (user B) share the same virtual space. That is, the user A and the user B share one virtual space via the communication network 3.

In FIG. 19A, the virtual space 200A of the user A includes the avatar 4A, the avatar 4B, and the virtual screen 6A. The avatar 4A is operated by the user A, and is configured to move in association with the action of the user A. The avatar 4B is operated by the user B, and is configured to move in association with the action of the user B.

For example, the positions of the avatars 4A and 4B may be identified based on the positions of the HMDs 110 of the user terminals 1A and 1B. In the same manner, the directions of the faces of the avatars 4A and 4B may be identified based on the inclinations of the HMDs 110 of the user terminals 1A and 1B. In addition, the actions of the hands of the avatars 4A and 4B may be identified based on the actions of the external controllers of the user terminals 1A and 1B. Relative positions of the irises and pupils with respect to the whites of the eyes of the avatars 4A and 4B may be identified based on the lines of sight of the users A and B, which are detected by the eye gaze sensor 140. In particular, the relative position of the iris and pupil of the left eye with respect to the white of the left eye of the avatar may be identified based on data representing the line of sight of the left eye of the user, which is detected by the eye gaze sensor for a left eye. In addition, the relative position of the iris and pupil of the right eye with respect to the white of the right eye of the avatar may be identified based on data representing the line of sight of the right eye of the user, which is detected by the eye gaze sensor for a right eye.

The lines of sight of the avatars 4A and 4B may be identified based on the inclinations of the HMDs 110 of the user terminals 1A and 1B. In other words, the line of sight of the avatar may be identified based on the visual axis L of the virtual camera. In this case, the line of sight of the avatar represents the lines of sight of both the eyes of the avatar. The lines of sight of the avatars 4A and 4B may be identified based on the inclinations of the HMDs 110 of the user terminals 1A and 1B and the lines of sight of the users A and B (lines of sight of both the eyes of the users A and B). In this case, the lines of sight of the users A and B is identified based on data representing the lines of sight of the users A and B detected by the eye gaze sensor 140 as described above.

The virtual camera 300 in FIG. 6 may be arranged at each of the eyes of the avatars 4A and 4B. In particular, the left-eye virtual camera may be arranged at each of the left eyes of the avatars 4A and 4B, while the right-eye virtual camera may be arranged at each of the right eyes of the avatars 4A and 4B. In the following description, it is assumed that the virtual camera 300 is arranged at each of the eyes of the avatars 4A and 4B. Therefore, the visual field CV of the virtual camera 300, in FIG. 7, matches the visual field CV of each of the avatars 4A and 4B.

The virtual screen 6A is configured to display the video content (moving image). The control unit 121 is capable of displaying the video content on a surface of the virtual screen 6A through the texture mapping. Each of the users A and B can enjoy the video content displayed on the virtual screen 6A through the visual-field image displayed on the HMD 110.

In FIG. 19B, the virtual space 200B of the user B includes the avatar 4A, the avatar 4B, and the virtual screen 6A. The positions of the avatars 4A and 4B within the virtual space 200A may correspond to the positions of the avatars 4A and 4B within the virtual space 200B.

With reference to FIG. 20, in Step S70, the control unit 121 of the user terminal 1A generates voice data on the user A. For example, when the user A inputs voice to the microphone 118 of the user terminal 1A, the microphone 118 generates voice data representing the input voice. The microphone 118 transmits the generated voice data to the control unit 121 via the I/O interface 124.

In Step S71, the control unit 121 of the user terminal 1A generates the control information on the avatar 4A, and then transmits the generated control information on the avatar 4A and the voice data representing the voice of the user A (voice data on the user A) to the server 2. The control unit 23 of the server 2 receives the control information on the avatar 4A and the voice data on the user A from the user terminal 1A (Step S72). In this case, the control information on the avatar 4A represents information required for controlling the action of the avatar 4A. The control information on the avatar 4A includes the information relating to the line of sight (line-of-sight information) of the avatar 4A. In addition, the control information on the avatar 4A may further include the information relating to the position of the avatar 4A, the information relating to the direction of the face of the avatar 4A, the information relating to the action of the hand of the avatar 4A, and information relating to the movement of the eye (in particular, the movement of the iris and pupil) of the avatar 4A.

In Step S73, the control unit 121 of the user terminal 1B generates the control information on the avatar 4B, and then transmits the generated control information on the avatar 4B to the server 2. The control unit 23 of the server 2 receives the control information on the avatar 4B from the user terminal 1B (Step S74). In this case, the control information on the avatar 4B represents information required for controlling the action of the avatar 4B. The control information on the avatar 4B includes the information relating to the line of sight (line-of-sight information) of the avatar 4B. In addition, the control information on the avatar 4B may further include the information relating to the position of the avatar 4B, the information relating to the direction of the face of the avatar 4B, the information relating to the action of the hand of the avatar 4B, and information relating to the movement of the eye (in particular, the movement of the iris and pupil) of the avatar 4B.

The server 2 transmits the control information on the avatar 4B to the user terminal 1A (Step S75), while transmitting the control information on the avatar 4A and the voice data on the user A to the user terminal 1B (Step S79). After receiving the control information on the avatar 4B in Step S76, the control unit 121 of the user terminal 1A updates the virtual space data representing the virtual space 200A in FIG. 19A based on the control information on the avatars 4A and 4B (Step S77). For example, when the avatars 4A and 4B move, the virtual space data representing the virtual space including the avatars 4A and 4B that have moved is generated. The control unit 121 of the user terminal 1A identifies the visual field CV of the avatar 4A (virtual camera 300) based on the position and the inclination of the HMD 110, and then updates the visual-field image displayed on the HMD 110 based on the updated virtual space data and the visual field CV of the avatar 4A (Step S78).

After receiving the control information on the avatar 4A and the voice data on the user A in Step S80, the control unit 121 of the user terminal 1B updates the virtual space data representing the virtual space 200B in FIG. 19B based on the control information on the avatars 4A and 4B (Step S81). The control unit 121 of the user terminal 1B identifies the visual field CV of the avatar 4B (virtual camera 300) based on the position and the inclination of the HMD 110, and then updates the visual-field image displayed on the HMD 110 based on the updated virtual space data and the visual field CV of the avatar 4B (Step S82).

The control unit 121 of the user terminal 1B processes the voice data on the user A based on the received voice data on the user A, the information relating to the position of the avatar 4A, which is included in the control information on the avatar 4A, and a predetermined voice processing algorithm. The control unit 121 transmits the processed voice data to the headphones 116, and then the headphones 116 output the voice of the user A based on the processed voice data (Step S83). A voice chat between the users (avatars) in the virtual space is possible.

In at least one embodiment, after the user terminals 1A and 1B transmit the control information on the avatar 4A and the control information on the avatar 4B, respectively, to the server 2, the server 2 transmits the control information on the avatar 4A to the user terminal 1B, and transmits the control information on the avatar 4B to the user terminal 1A. The movements of the respective avatars 4A and 4B can be synchronized between the user terminal 1A and the user terminal 1B. The respective processing steps in FIG. 20 may be executed for every frame.

In the case of synchronizing the movements of the respective avatars 4A to 4C are to be synchronized among the user terminals 1A to 1C, the user terminal 1A transmits the control information on the avatar 4A to the server 2, the user terminal 1B transmits the control information on the avatar 4B to the server 2, and the user terminal 1C transmits the control information on the avatar 4C to the server 2. The server 2 transmits the control information on the avatars 4A and 4C to the user terminal 1B, transmits the control information on the avatars 4B and 4C to the user terminal 1A, and transmits the control information on the avatars 4A and 4B to the user terminal 1C.

Figure 21:
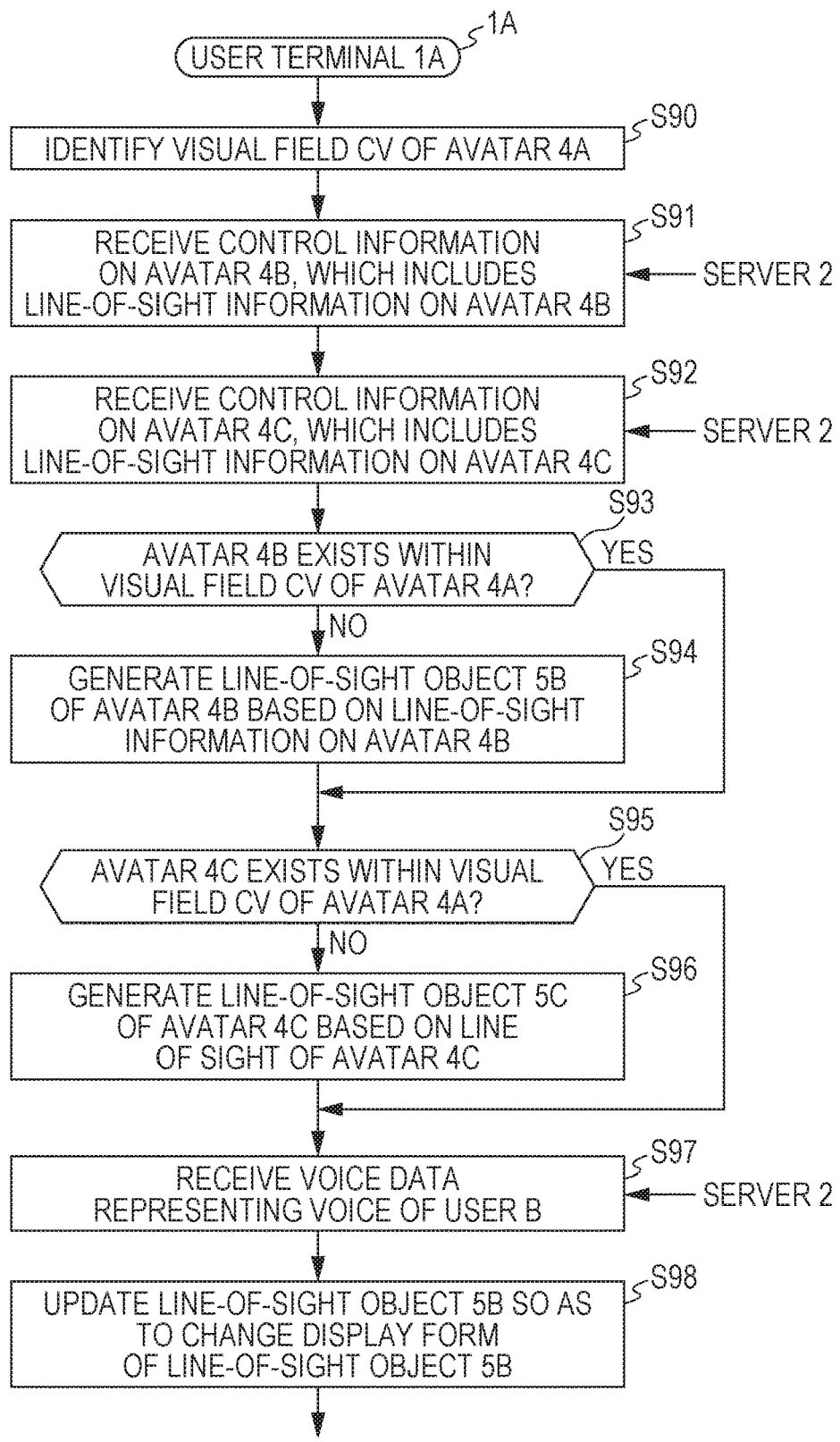
FIG. 21 is a flowchart of an information processing method according to at least one embodiment of this disclosure.
Figure 22:
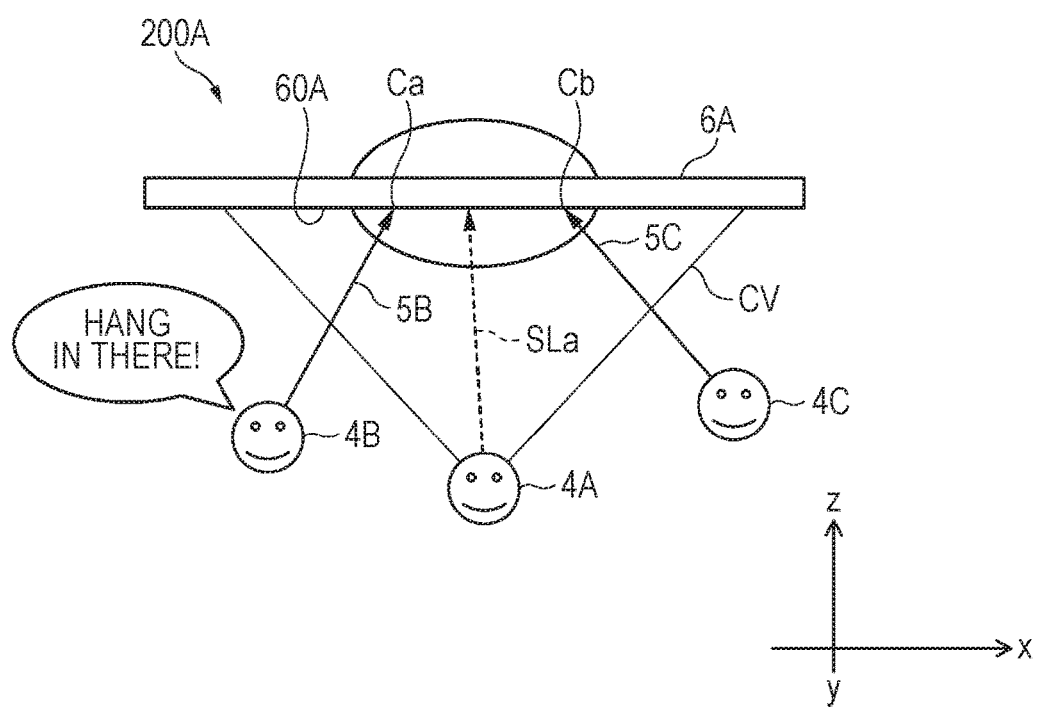
FIG. 22 is a plan view of the virtual space provided to the user A according to at least one embodiment of this disclosure.
Figure 23:
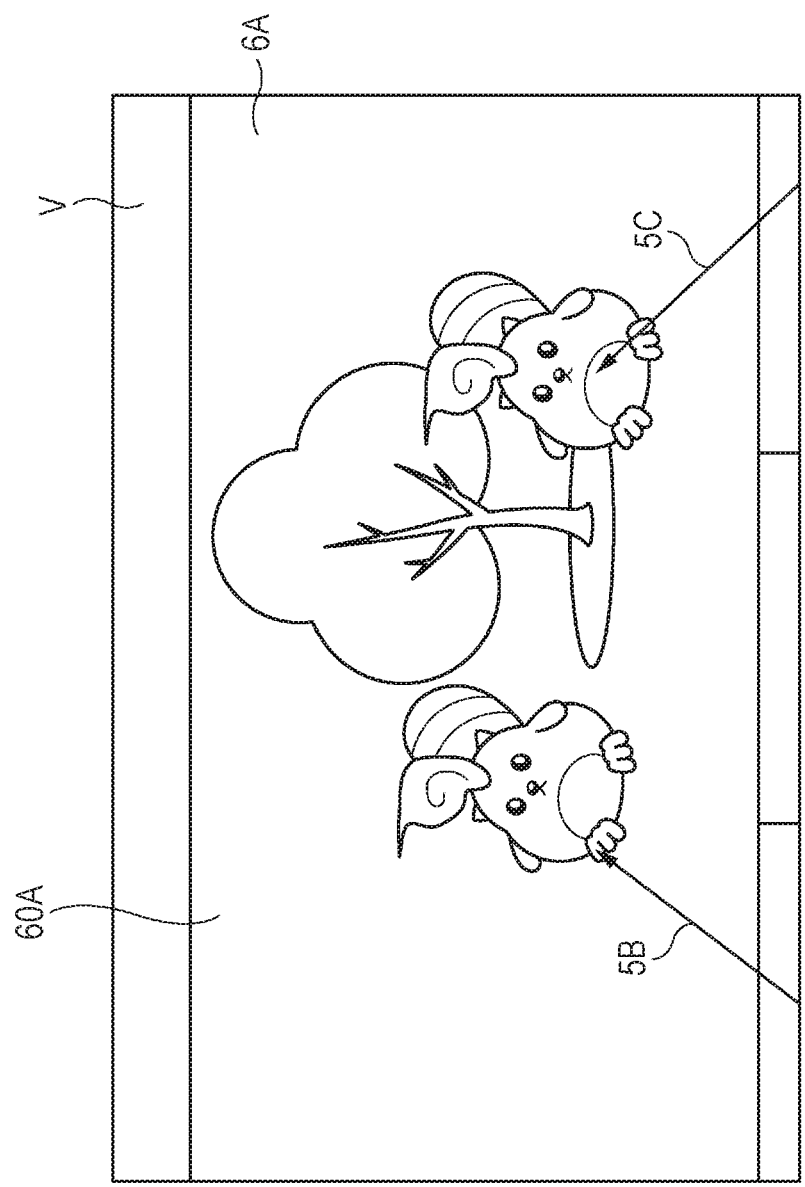
FIG. 23 is a diagram of the visual-field image displayed on the HMD of a user terminal 1A according to at least one embodiment of this disclosure.
Figure 24:
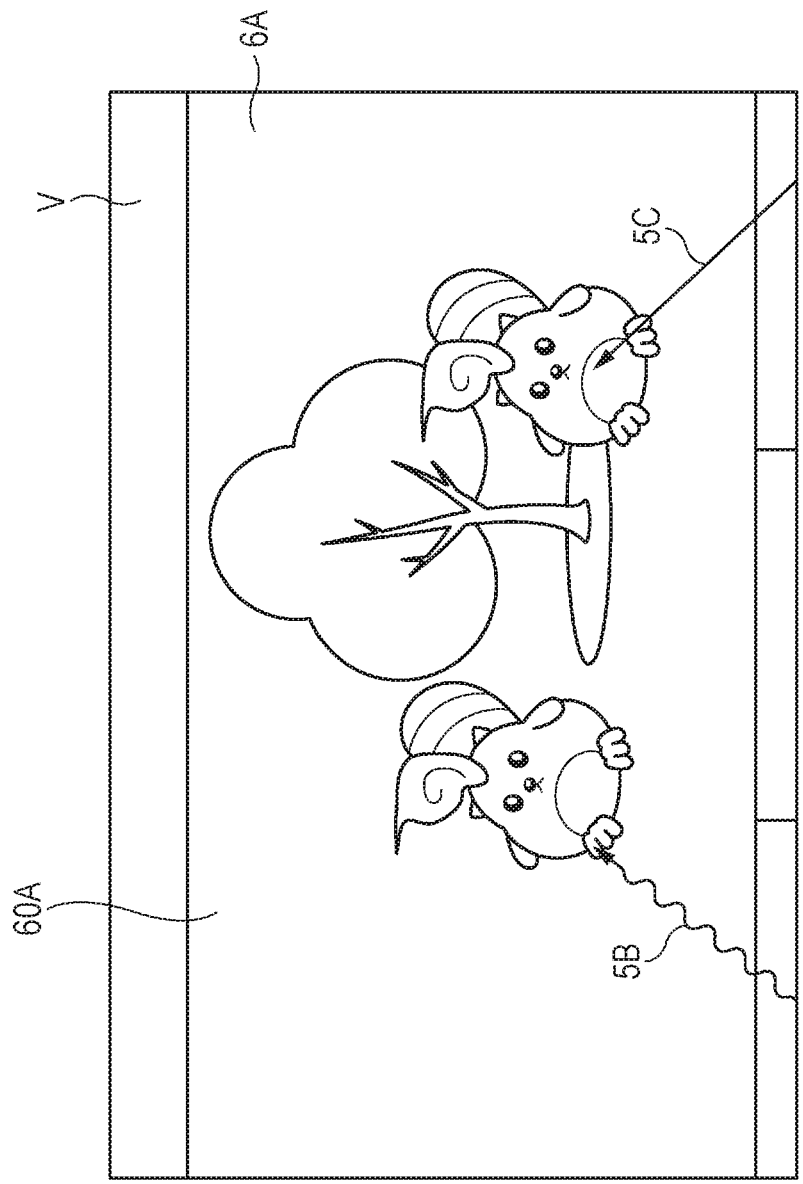
FIG. 24 is a diagram of the visual-field image displayed on the HMD of the user terminal 1A according to at least one embodiment of this disclosure.

With reference to FIG. 21 to FIG. 24, a description is given of an information processing method according to at least one embodiment of this disclosure. FIG. 21 is a flowchart of the information processing method according to at least one embodiment. FIG. 22 is a plan view of the virtual space 200A provided to the user A before voice is input to the microphone 118 of the user terminal 1B according to at least one embodiment. FIG. 23 is a diagram of the visual-field image V displayed on the HMD 110 of the user terminal 1A before the voice is input to the microphone 118 of the user terminal 1B according to at least one embodiment. FIG. 24 is a diagram of the visual-field image V displayed on the HMD 110 of the user terminal 1A after the voice is input to the microphone 118 of the user terminal 1B according to at least one embodiment.

In at least one embodiment, in FIG. 22, the avatar 4A, the avatar 4B, and the avatar 4C associated with the user terminal 1C (user C) share the same virtual space. That is, the users A to C share one virtual space via the communication network 3. The avatar 4C is operated by the user C, and is configured to move in association with the action of the user C. The avatars 4A to 4C are viewing the video content displayed on the display screen 60A of the virtual screen 6A. In FIG. 22, a line of sight SLa of the avatar 4A, which is not visualized, indicates a predetermined spot on the display screen 60A.

The virtual space 200A of the user A includes the avatar 4A, the avatar 4B, the avatar 4C, and the virtual screen 6A. The control unit 121 of the user terminal 1A generates the virtual space data representing the virtual space 200A.

With reference to FIG. 21, in Step S90, the control unit 121 of the user terminal 1A (hereinafter referred to simply as "control unit 121") identifies the visual field CV of the avatar 4A. As described above, the visual field CV of the avatar 4A matches the visual field CV of the virtual camera arranged at the eye of the avatar 4A. The control unit 121 updates the visual field CV of the avatar 4A in accordance with the movement of the HMD 110 of the user terminal 1A. Processing for updating the visual field CV of the avatar 4A may be executed for every frame. In addition, the control unit 121 updates the visual-field image V displayed on the HMD 110 based on the updated visual field CV and the virtual space data representing the virtual space 200A. Processing for updating the visual-field image may be executed for every frame as well.

In Step S91, the control unit 121 receives the control information on the avatar 4B, which is required for controlling the action of the avatar 4B, from the server 2. In this case, the control information on the avatar 4B includes the information relating to the line of sight (line-of-sight information) of the avatar 4B. Specifically, after receiving the control information on the avatar 4B from the user terminal 1B, the server 2 transmits the control information on the avatar 4B to the user terminals 1A and 1C. The control unit 121 receives the control information on the avatar 4B from the server 2.

In Step S92, the control unit 121 receives the control information on the avatar 4C, which is required for controlling the action of the avatar 4C, from the server 2. In this case, the control information on the avatar 4C includes the line-of-sight information on the avatar 4C. Specifically, after receiving the control information on the avatar 4C from the user terminal 1C, the server 2 transmits the control information on the avatar 4C to the user terminals 1A and 1B. The control unit 121 receives the control information on the avatar 4C from the server 2.

It is to be noted that, before the processing of Step S91, the control unit 121 transmits the control information on the avatar 4A, which is required for controlling the action of the avatar 4A, to the server 2.

The control unit 121 determines whether or not the avatar 4B exists within the visual field CV of the avatar 4A based on the information relating to the position of the avatar 4B, which is included in the control information on the avatar 4B (Step S93). When determining that the avatar 4B does not exist within the visual field CV of the avatar 4A (NO in Step S93), the control unit 121 generates a line-of-sight object 5B of the avatar 4B, in FIG. 22, based on the line-of-sight information on the avatar 4B (Step S94).

For example, in FIG. 22, the control unit 121 may generate the line-of-sight object 5B based on the line of sight of the avatar 4B and an intersecting point Ca, which is an intersection between the line of sight of the avatar 4B and the display screen 60A of the virtual screen 6A. In particular, the control unit 121 may identify the direction of the line-of-sight object 5B based on the direction of the line of sight of the avatar 4B, and may identify the length of the line-of-sight object 5B based on a distance between the position of the avatar 4B and the intersecting point Ca.

When the control unit 121 determines that the avatar 4B exists within the visual field CV of the avatar 4A (YES in Step S93), the procedure advances to the processing of Step S95. In Step S95, the control unit 121 determines whether or not the avatar 4C exists within the visual field CV of the avatar 4A based on the information relating to the position of the avatar 4C, which is included in the control information on the avatar 4C (Step S95). When determining that the avatar 4C does not exist within the visual field CV of the avatar 4A (NO in Step S95), the control unit 121 generates a line-of-sight object 5C of the avatar 4C, which is illustrated in FIG. 22, based on the line-of-sight information on the avatar 4C (Step S96).

For example, in FIG. 22, the control unit 121 may generate the line-of-sight object 5C based on the line of sight of the avatar 4C and an intersecting point Cb, which is an intersection between the line of sight of the avatar 4C and the display screen 60A of the virtual screen 6A. In particular, the control unit 121 may identify the direction of the line-of-sight object 5C based on the direction of the line of sight of the avatar 4C, and may identify the length of the line-of-sight object 5C based on a distance between the position of the avatar 4C and the intersecting point Cb. When the control unit 121 determines that the avatar 4C exists within the visual field CV of the avatar 4A (YES in Step S95), the procedure advances to the processing of Step S97.

The line-of-sight objects 5B and 5C are generated, and hence the lines of sight of the avatars 4B and 4C are visualized in the virtual space 200A. For example, in FIG. 23, the lines of sight of the avatars 4B and 4C (namely, the line-of-sight objects 5B and 5C), which have been visualized, are displayed in the visual-field image V displayed on the HMD 110 of the user terminal 1A.

In Step S97, the control unit 121 receives the voice data representing the voice of the user B (voice data on the user B). For example, when the user B inputs voice (for example, "Hang in there!") to the microphone 118 of the user terminal 1B, the microphone 118 generates voice data representing the input voice, and then transmits the generated voice data to the control unit 121 of the user terminal 1B via the I/O interface 124. After the control unit 121 of the user terminal 1B transmits the voice data to the server 2, the server 2 transmits the voice data to the user terminals 1A and 1C. The control unit 121 of the user terminal 1A receives the voice data on the user B from the server 2. The control unit 121 processes the voice data on the user B based on the received voice data on the user B, the information relating to the position of the avatar 4B, which is included in the control information on the avatar 4B, and a predetermined voice processing algorithm. The control unit 121 transmits the processed voice data to the headphones 116, and then the headphones 116 output the voice of the user B based on the processed voice data.

The control unit 121 updates the line-of-sight object 5B so as to change a display form of the line-of-sight object 5B (Step S98). In this regard, as a change in display form of the line-of-sight object 5B, the control unit 121 may continuously change a shape and a color of the line-of-sight object 5B on a time axis. For example, in FIG. 24, the control unit 121 may change the shape of the line-of-sight object 5B in a wave-like form. In particular, the wave-like form of the line-of-sight object 5B may be continuously changed on the time axis.

When the updated line-of-sight object 5B and the line-of-sight object 5C exist within the visual field of the avatar 4A, as illustrated in FIG. 24, the control unit 121 displays the visual-field image V including the updated line-of-sight object 5B and the line-of-sight object 5C on the HMD 110 of the user terminal 1A.

According to at least one embodiment, the voice of the user B ("Hang in there!") is input when the microphone 118 of the user terminal 1B, the voice data on the user B is received from the user terminal 1B via the server 2. The line-of-sight object 5B is updated so that the display form of the line-of-sight object 5B of the avatar 4B is changed, and the visual-field image V including the updated line-of-sight object 5B and the line-of-sight object 5C is displayed on the HMD 110 of the user terminal 1A. Therefore, the user A can easily grasp the fact that the voice has been output from the user B associated with the avatar 4B by visually recognizing a change in display form of the line-of-sight object 5B. That is, the user A can easily grasp which user is currently talking based on the change in display form of the line-of-sight object 5B. Therefore, the information processing method is capable of improving a virtual experience of the user within the virtual space shared by a plurality of users.

According to at least one embodiment, when the avatar 4B does not exist within the visual field CV of the avatar 4A, the line-of-sight object 5B is generated based on the line of sight of the avatar 4B and the intersecting point Ca. In addition, when the avatar 4C does not exist within the visual field CV of the avatar 4A, the line-of-sight object 5C is generated based on the line of sight of the avatar 4C and the intersecting point Cb. Even when the avatars 4B and 4C are not displayed within the visual-field image V, the user A can easily grasp the fact that the voice has been output from the user B relating to the avatar 4B by visually recognizing the change in display form of the line-of-sight object 5B.

In at least one embodiment, when the avatar 4B (4C) exists within the visual field CV of the avatar 4A, the user A can relatively easily identify which user is currently talking, and hence the line-of-sight object 5B (5C) is not generated. However, even when the avatar 4B (4C) exists within the visual field CV of the avatar 4A, the control unit 121 may generate the line-of-sight object 5B (5C).

Figure 25:
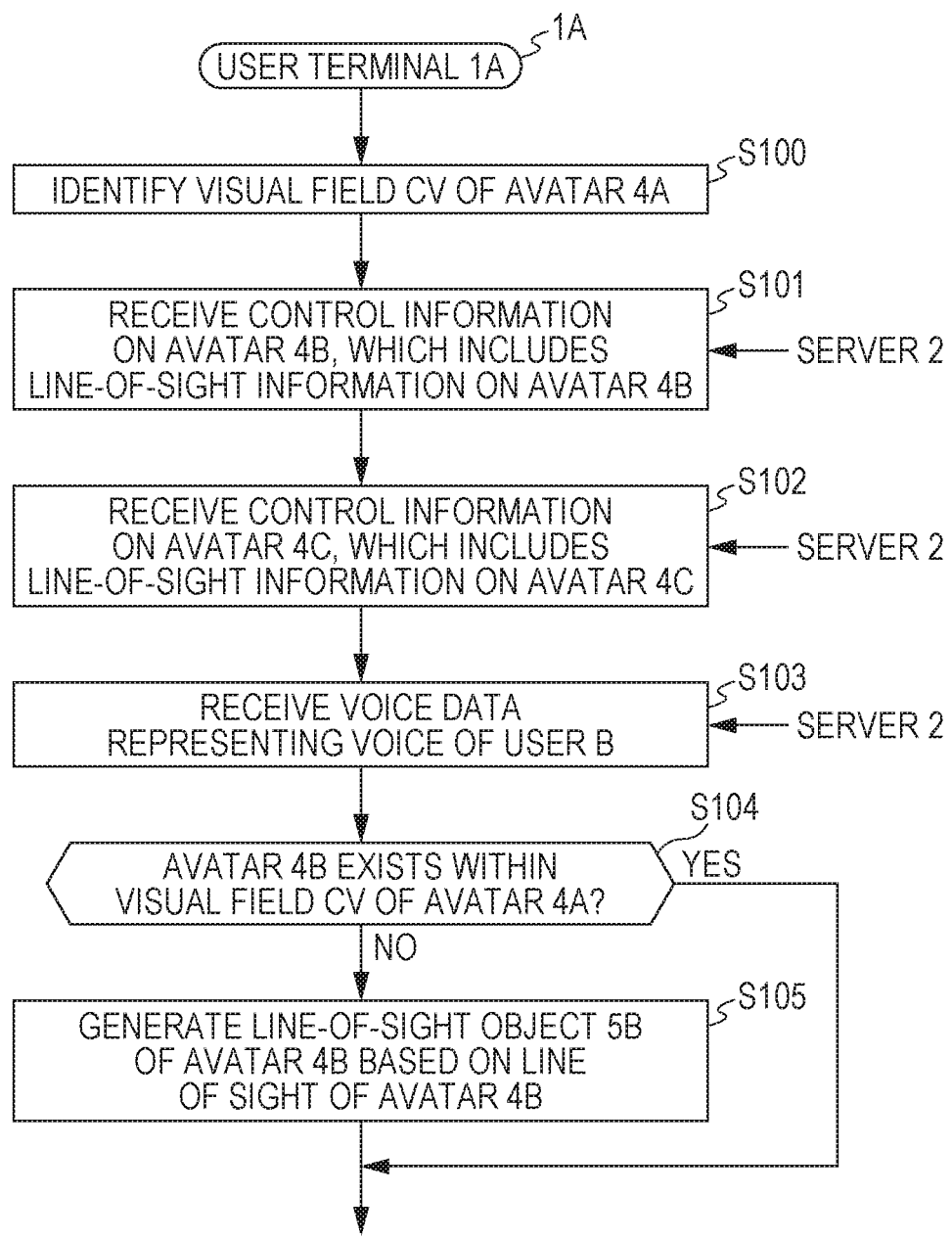
FIG. 25 is a flowchart of an information processing method according to at least one embodiment of this disclosure.
Figure 26:
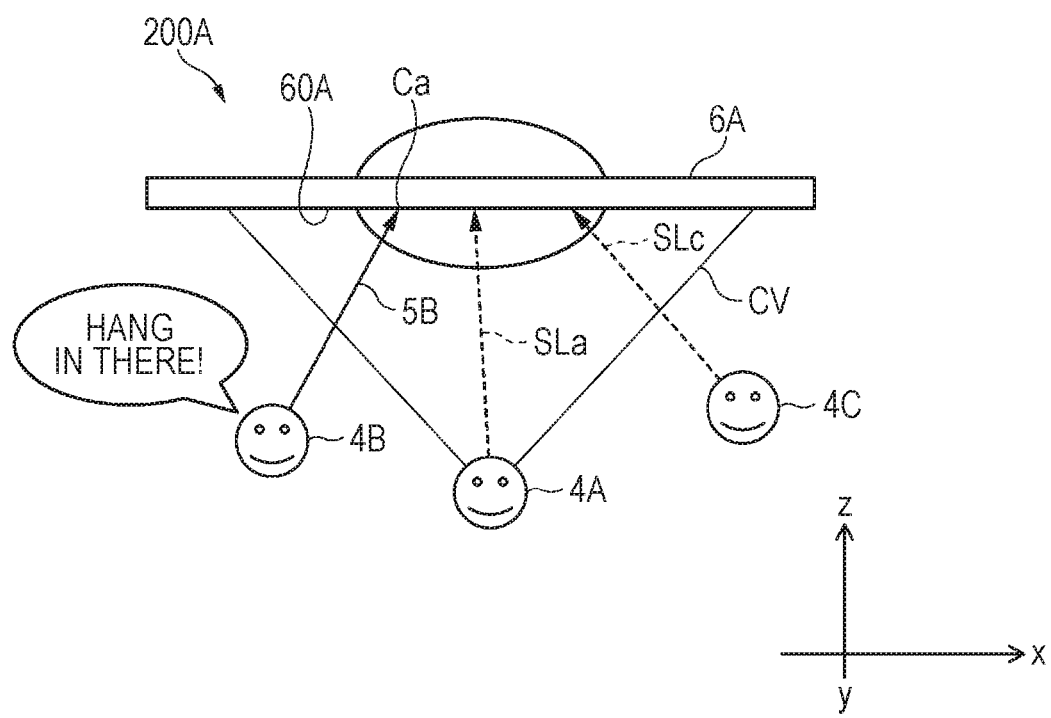
FIG. 26 is a diagram of the virtual space provided to the user A according to at least one embodiment of this disclosure.
Figure 27:
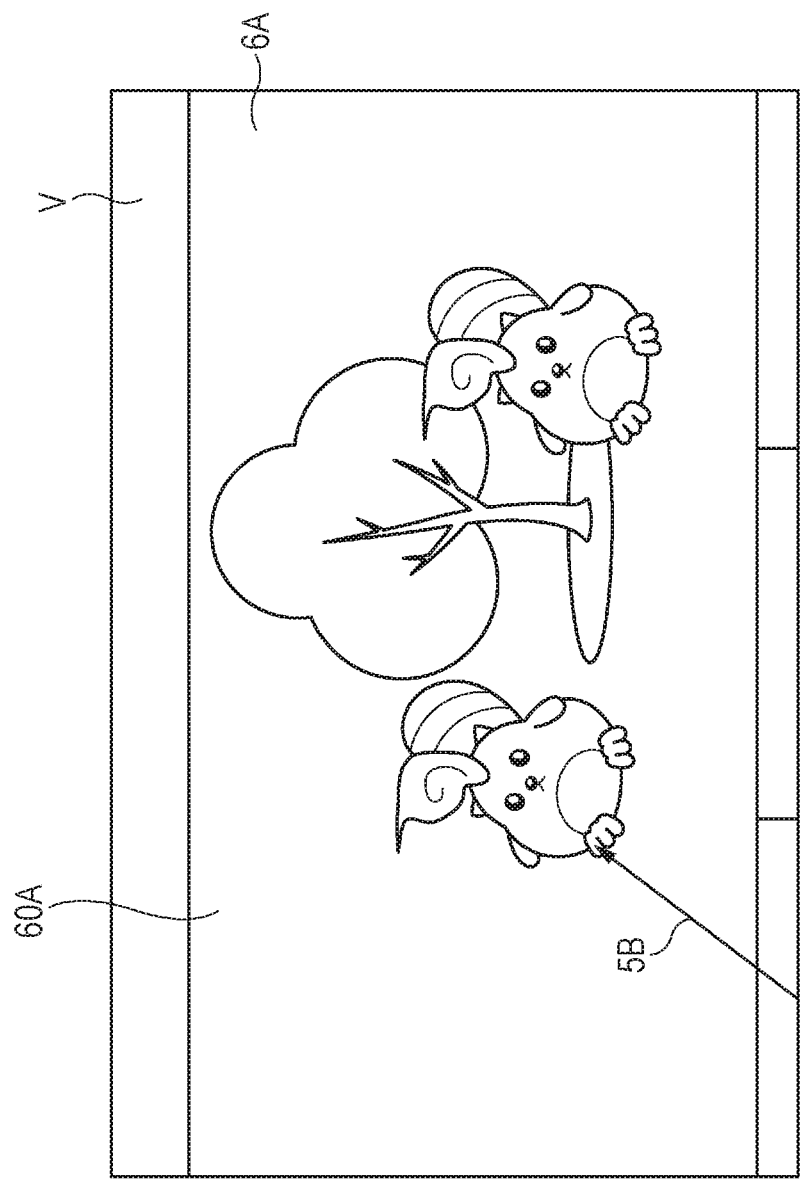
FIG. 27 is a diagram of the visual-field image displayed on the HMD of the user terminal 1A according to at least one embodiment of this disclosure.

With reference to FIG. 25 to FIG. 27, a description is given of an information processing method according to at least one embodiment of this disclosure. FIG. 25 is a flowchart of the information processing method according to at least one embodiment. FIG. 26 is a plan view of the virtual space 200A provided to the user A after voice is input to the microphone 118 of the user terminal 1B according to at least one embodiment. FIG. 27 is a diagram of the visual-field image V displayed on the HMD 110 of the user terminal 1A after the voice is input to the microphone 118 of the user terminal 1B according to at least one embodiment. The situation with respect to FIG. 25 to FIG. 27 is similar to the situation with respect to FIG. 21 to FIG. 24.

With reference to FIG. 25, in Step S100, the control unit 121 of the user terminal 1A (hereinafter referred to simply as "control unit 121") identifies the visual field CV of the avatar 4A. The control unit 121 receives the control information on the avatar 4B, which includes the line-of-sight information on the avatar 4B, from the server 2 (Step S101). The control unit 121 receives the control information on the avatar 4C, which includes the line-of-sight information on the avatar 4C, from the server 2 (Step S102). Before the processing of Step S101, the control unit 121 transmits the control information on the avatar 4A to the server 2.

In Step S103, after receiving the voice data representing the voice of the user B (for example, "Hang in there!") (voice data on the user B) from the server 2, the control unit 121 processes the voice data on the user B. The headphones 116 output the voice of the user B based on the processed voice data.

The control unit 121 determines that the user who has output the voice is the user B, and then determines whether or not the avatar 4B exists within the visual field CV of the avatar 4A based on the information relating to the position of the avatar 4B, which is included in the control information on the avatar 4B (Step S104). When determining that the avatar 4B does not exist within the visual field CV of the avatar 4A (NO in Step S104), the control unit 121 generates the line-of-sight object 5B of the avatar 4B, in FIG. 26, based on the line-of-sight information on the avatar 4B (Step S105). The method of generating the line-of-sight object 5B is as described above. When the determination of Step S104 results in YES, the line-of-sight object 5B of the avatar 4B is not generated.

Only the line-of-sight object 5B of the avatar 4B associated with the user B who has output the voice is generated, and hence only the line of sight of the avatar 4B is visualized in the virtual space 200A. For example, in FIG. 27, only the visualized line of sight of the avatar 4B (namely, the line-of-sight object 5B) is displayed in the visual-field image V displayed on the HMD 110 of the user terminal 1A. A line-of-sight object corresponding to a line of sight SLc of the avatar 4C, in FIG. 26, is not generated, and hence the line of sight SLc of the avatar 4C is not visualized.

According to at least one embodiment, when the line-of-sight object 5B exists within the visual field CV of the avatar 4A, in FIG. 27, the control unit 121 displays the visual-field image V including the line-of-sight object 5B on the HMD 110 of the user terminal 1A. Therefore, the user A can easily grasp the fact that the voice has been output from the user B associated with the avatar 4B by visually recognizing the line-of-sight object 5B displayed within the visual-field image V.

According to at least one embodiment, when the avatar 4B does not exist within the visual field CV of the avatar 4A, the line-of-sight object 5B is generated. Even when the avatar 4B is not displayed within the visual-field image V, the user A can easily grasp the fact that the voice has been output from the user B associated with the avatar 4B by visually recognizing the line-of-sight object 5B. Even when the avatar 4B exists within the visual field CV of the avatar 4A, the control unit 121 may generate the line-of-sight object 5B.

Figure 28:
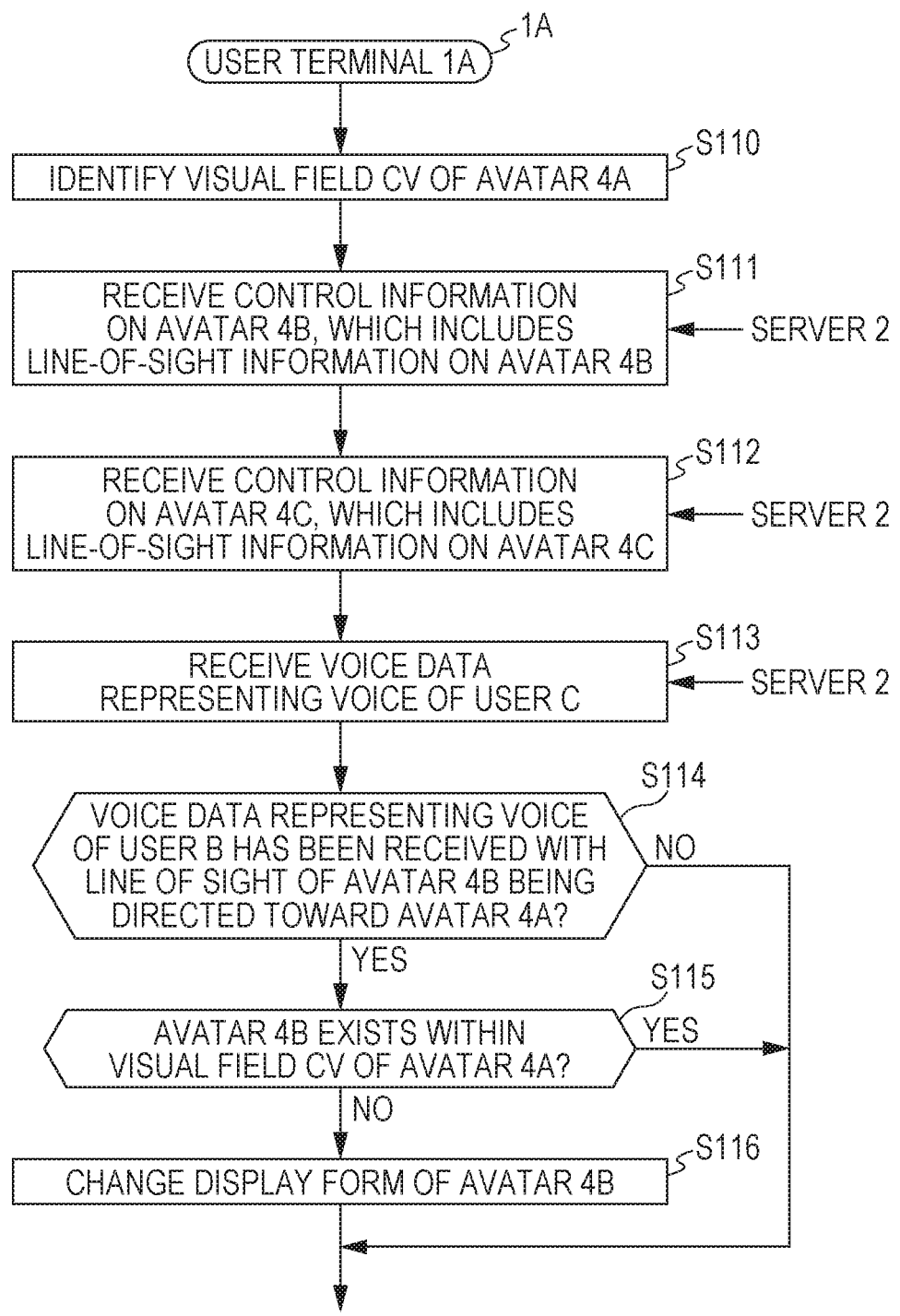
FIG. 28 is a flowchart of an information processing method according to at least one embodiment of this disclosure.
Figure 29B:
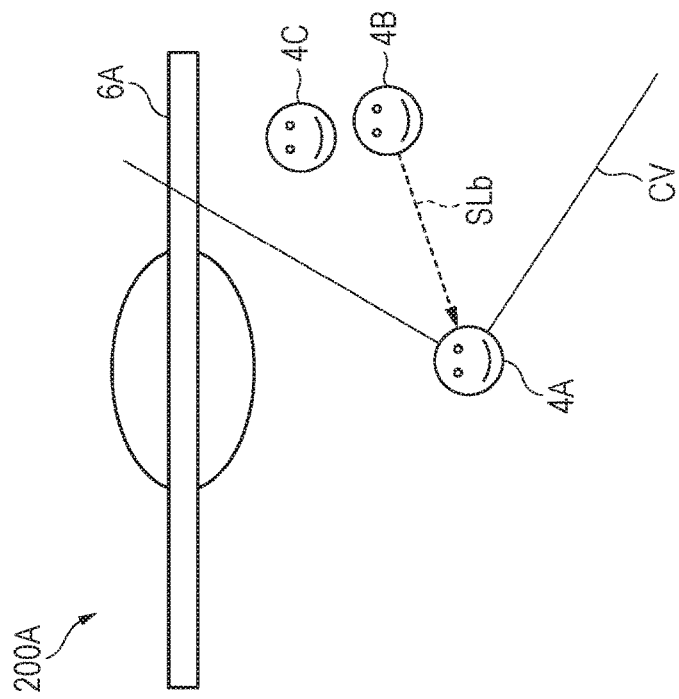
FIG. 29B is a diagram of the virtual space provided to the user A, which indicates a state under which an avatar 4A has turned to face an avatar 4B according to at least one embodiment of this disclosure.
Figure 29A:
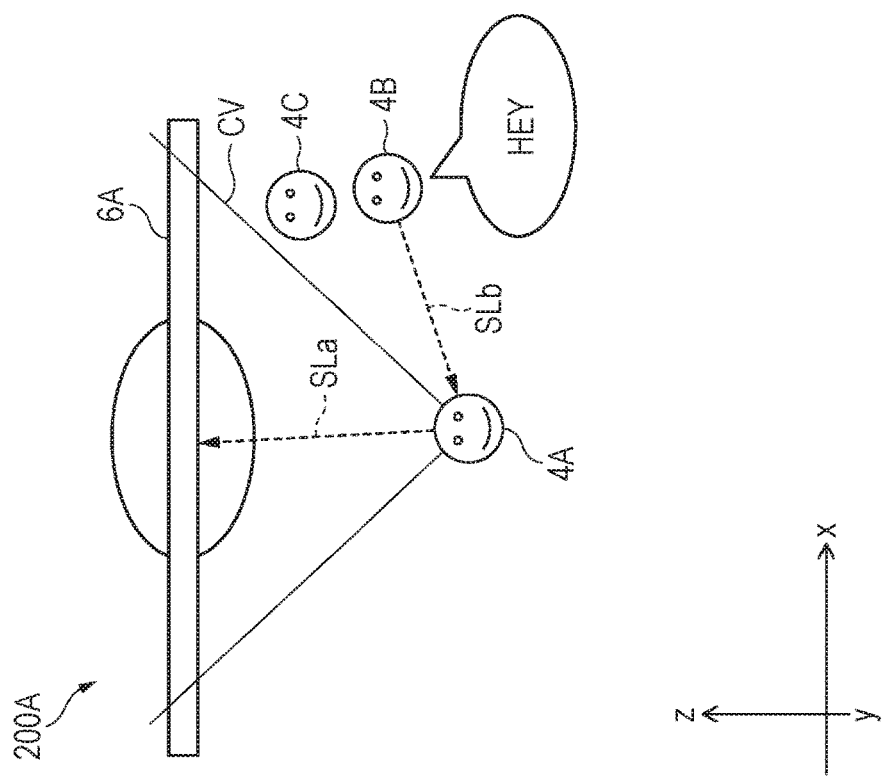
FIG. 29A is a diagram of the virtual space provided to the user A according to at least one embodiment of this disclosure.
Figure 30A:
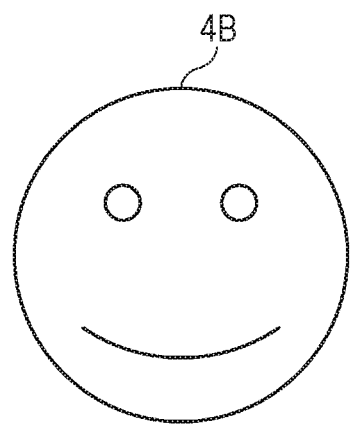
FIG. 30A is a diagram of a state of a face of the avatar 4B exhibited in FIG. 29A according to at least one embodiment of this disclosure.
Figure 30B:
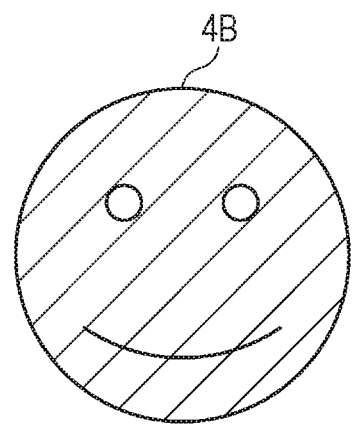
FIG. 30B is a diagram of the state of the face of the avatar 4B exhibited in FIG. 29B according to at least one embodiment of this disclosure.

With reference to FIG. 28 to FIG. 30, a description is given of an information processing method according to at least one embodiment of this disclosure. FIG. 28 is a flowchart of the information processing method according to at least one embodiment. FIG. 29A is a plan view of the virtual space 200A provided to the user A, which indicates a state under which the avatar 4B is talking to the avatar 4A according to at least one embodiment. FIG. 29B is a plan view of the virtual space 200A provided to the user A, which indicates a state under which the avatar 4A has turned to face the avatar 4B according to at least one embodiment. FIG. 30A is a diagram of a state of the face of the avatar 4B in FIG. 29A according to at least one embodiment. FIG. 30B is a diagram of a state of the face of the avatar 4B in FIG. 29B according to at least one embodiment. The situation in FIG. 28 to FIG. 30B is similar to the situation in FIG. 21 to FIG. 24 except for the position of arrangement of each avatar.

With reference to FIG. 28, in Step S110, the control unit 121 of the user terminal 1A (hereinafter referred to simply as "control unit 121") identifies the visual field CV of the avatar 4A. The control unit 121 receives the control information on the avatar 4B, which includes the line-of-sight information on the avatar 4B, from the server 2 (Step S111). The control unit 121 receives the control information on the avatar 4C, which includes the line-of-sight information on the avatar 4C, from the server 2 (Step S112). Before the processing of Step S111, the control unit 121 transmits the control information on the avatar 4A to the server 2.

In Step S113, after receiving the voice data representing the voice of the user B (for example, "Hey") (voice data on the user B) from the server 2, the control unit 121 processes the voice data on the user B. The headphones 116 output the voice of the user B based on the processed voice data.

The control unit 121 determines that the user who has output the voice is the user B, and then determines whether or not the voice data on the user B has been received with a line of sight SLb of the avatar 4B being directed toward the avatar 4A (Step S114). Specifically, the control unit 121 determines whether or not the line of sight SLb of the avatar 4B intersects with the avatar 4A based on the line-of-sight information on the avatar 4B and information relating to the positions of the avatars 4B and 4A during a period during which the voice data on the user B is being received from the server 2. When the determination of Step S114 results in YES, the control unit 121 determines whether or not the avatar 4B exists within the visual field CV of the avatar 4A (Step S115). When the determination of Step S115 results in NO, the control unit 121 updates the avatar 4B so as to change the display form of the avatar 4B (Step S116).

For example, in FIG. 30B, the control unit 121 may change a color of the face of the avatar 4B. The control unit 121 may change a color, a shape, or the like of a predetermined body part of the avatar 4B other than the face. When the avatar 4A turns around toward the avatar 4B in response to calling ("Hey") from the avatar 4B, in FIG. 30B, the updated avatar 4B (avatar 4B with the face having been changed in color) and the avatar 4C are positioned within the visual field CV of the avatar 4A. That is, the avatar 4C and the visual-field image including the avatar 4B with the face having been changed in color are displayed on the HMD 110 of the user terminal 1A, and hence the user A can easily grasp the fact that the avatar who has talked to the avatar 4A is the avatar 4B by visually recognizing the avatar 4B with the face having been changed in color. According to at least one embodiment, the user A can easily grasp the fact that the voice has been output from the user B associated with the avatar 4B by visually recognizing the change in display form of the avatar 4B. When the determination of Step S114 results in NO or when the determination of Step S115 results in YES, the display form of the avatar 4B is not changed.

According to at least one embodiment, when the avatar 4B does not exist within the visual field CV of the avatar 4A, the display form of the avatar 4B is changed. Even in a case where the avatar 4B is not displayed within the visual-field image V when the user A is talked to by the avatar 4B, the user A can easily grasp the fact that the voice has been output from the user B associated with the avatar 4B later by visually recognizing the change in display form of the avatar 4B. Even when the avatar 4B exists within the visual field CV of the avatar 4A, the control unit 121 may change the display form of the avatar 4B.

The above descriptions of embodiments presuppose that the virtual space data representing the virtual space 200A is updated by the user terminal 1A, but the virtual space data may be updated by the server 2. Further, the above descriptions of embodiments presuppose that the visual-field image data corresponding to the visual-field image V is updated by the user terminal 1A, but the visual-field image data may be updated by the server 2. In this case, the user terminal 1A displays the visual-field image on the HMD 110 based on the visual-field image data transmitted from the server 2.

In order to implement various types of processing to be executed by the control unit 23 of the server 2 (or the control unit 121 of the user terminal 1) with use of software, a control program for executing various kinds of processing on a computer (processor) may be installed in advance into the storage unit 22 (or the storage unit 123) or the memory. Alternatively, the control program may be stored in a computer-readable storage medium, for example, a magnetic disk (HDD or floppy disk), an optical disc (for example, CD-ROM, DVD-ROM, or Blu-ray disc), a magneto-optical disk (for example, MO), and a flash memory (for example, SD card, USB memory, or SSD). In this case, the storage medium is connected to the server 2 (or the control device 120), and hence the program stored in the storage medium is installed into the storage unit 22 (or the storage unit 123). Then, the control program installed in the storage unit 22 (or the storage unit 123) is loaded onto the RAM, and the processor executes the loaded program. In this manner, the control unit 23 (or the control unit 121) executes the various kinds of processing.

The control program may be downloaded from a computer on the communication network 3 via the communication interface. Also in this case, the downloaded program is similarly installed into the storage unit 22 (or the storage unit 123).

This concludes description of some embodiments of this disclosure. However, the description is not to be read as a restrictive interpretation of the technical scope of this disclosure. The above described embodiments are merely given as an example, and a person skilled in the art would understand that various modifications can be made to the embodiment within the scope of this disclosure set forth in the appended claims. Thus, the technical scope of this disclosure is to be defined based on the scope of this disclosure set forth in the appended claims and an equivalent scope thereof.

[Supplementary Note 1]

(1) An information processing method to be executed by a computer in a virtual space distribution system. The virtual space distribution system includes a plurality of user terminals, each including a head-mounted device to be worn on a head of a user; and a server. The information processing method includes generating first virtual space data for defining a first virtual space. The first virtual space includes a first avatar associated with a first user terminal among the plurality of user terminals; and a first virtual room in which the first avatar is arranged. The method further includes receiving, from a second user terminal among the plurality of user terminals, a visiting request signal for requesting that a second avatar associated with the second user terminal visit the first virtual room. The method further includes determining, in response to receiving the visiting request, whether or not the first virtual room is to be updated based on a total number of avatars currently arranged in the first virtual room and second avatars. The method further includes updating, in response to a determination that the first virtual room is to be updated, the first virtual room so as to update a size of the first virtual room.

(2) An information processing method according to Item (1), further including arranging the first avatar in the updated first virtual room so as to maintain a relative positional relationship between the first avatar and the first virtual room.

(3) An information processing method according to Item (1) or (2), in which the first virtual room includes a first virtual screen configured to display a moving image. The updating includes updating the first virtual room so as to enlarge a size of the first virtual screen based on enlargement of the size of the first virtual room.

(4) An information processing method according to any one of Items (1) to (3), in which the first virtual room includes a first virtual screen configured to display a moving image. The information processing method further includes receiving, from the first user terminal, a screen enlargement request signal for requesting that a size of the first virtual screen be enlarged to a predetermined size. The method further includes updating the first virtual screen so as to enlarge the size of the first virtual screen to the predetermined size based on the screen enlargement request signal.

(5) An information processing method according to Item (4), further including determining a billing amount to be billed to a first user wearing the head-mounted device of the first user terminal for viewing of the moving image performed by the first user. Determining the billing amount includes updating the billing amount to be billed to the first user based on the screen enlargement request signal.

(6) An information processing method according to Item (5), in which the updating includes updating the first virtual room so as to enlarge the size of the first virtual screen based on enlargement of the size of the first virtual room. The first user is billed a first billing amount when the size of the first virtual screen is enlarged to a predetermined size based on the enlargement of the size of the first virtual room, the first billing amount being smaller than a second billing amount to be billed to the first user when the size of the first virtual screen is enlarged to the predetermined size based on the screen enlargement request signal.

(7) A system for executing the information processing method of any one of Items (1) to (6).

[Supplementary Note 2]

A description is given of outlines of embodiments of this disclosure.

(11) An information processing method to be executed by a computer in a virtual space distribution system. The virtual space distribution system includes a plurality of user terminals, each including a head-mounted device, a voice input unit for inputting voice, and a voice output unit for outputting voice; and a server. The information processing method includes generating virtual space data for defining a virtual space. The virtual space includes a first avatar associated with a first user terminal among the plurality of user terminals; a second avatar associated with a second user terminal among the plurality of user terminals; and a third avatar associated with a third user terminal among the plurality of user terminals. The method further includes updating a visual field of the first avatar in accordance with a movement of the head-mounted device of the first user terminal. The method further includes displaying a visual-field image on the head-mounted device of the first user terminal based on the visual field of the first avatar and the virtual space data. The method further includes receiving, when voice is input to the voice input unit of the second user terminal, voice data representing the input voice from the second user terminal. The method further includes changing, in response to receiving the input voice, one of a display form of the second avatar and a display form of a line of sight of the second avatar in the visual-field image displayed on the head-mounted device of the first user terminal.

(12) An information processing method according to Item (11), further including generating a second line-of-sight object based on the line of sight of the second avatar. The method further includes generating a third line-of-sight object based on a line of sight of the third avatar. The changing includes updating, in response to receiving the input voice, the second line-of-sight object so as to change the display form of the second line-of-sight object. The changing further includes displaying, when the updated second line-of-sight object and the third line-of-sight object exist within the visual field of the first avatar, the visual-field image including the updated second line-of-sight object and the third line-of-sight object on the head-mounted device of the first user terminal.

(13) An information processing method according to Item (12), further including executing the generating of the second line-of-sight object when the second avatar does not exist within the visual field of the first avatar. The method further includes executing generating of the third line-of-sight object when the third avatar does not exist within the visual field of the first avatar.

(14) An information processing method according to Item (11), in which the changing includes generating, in response to receiving the input voice, a second line-of-sight object based on the line of sight of the second avatar. The chaining further includes displaying, when the second line-of-sight object exists within the visual field of the first avatar, the visual-field image including the second line-of-sight object on the head-mounted device of the first user terminal.

(15) An information processing method according to Item (14), further including executing the generating of the second line-of-sight object when the second avatar does not exist within the visual field of the first avatar.

(16) An information processing method according to Item (11), in which the changing includes updating, in response to receiving the input voice, the second avatar so as to change the display form of the second avatar when voice is input to the voice input unit of the second user terminal with the line of sight of the second avatar being directed toward the first avatar. The changing further includes displaying, when the second avatar exists within the visual field of the first avatar, the visual-field image including the updated second avatar on the head-mounted device of the first user terminal.

(17) An information processing method according to Item (16), further including executing the changing of the display form of the second avatar when the second avatar does not exist within the visual field of the first avatar.

(18) A system for executing the information processing method of any one of Items (11) to (17).

What is claimed is:

1. A method, comprising:
generating first virtual space data for defining a first virtual space, the first virtual space includes:
a first avatar, which is associated with a first user terminal; and
a first virtual room, in which the first avatar and a first virtual screen are arranged, wherein the first virtual screen is configured to display a moving image, and the first virtual room is managed by the first user terminal;
detecting a movement of a head mounted device (HMD), wherein the HMD is included in the first user terminal;
identifying a visual field within the first virtual space in accordance with the detected movement of the HMD;
displaying, on the HMD, a visual-field image corresponding to the visual field within the first virtual space;
receiving, from a second user terminal, a visiting request signal for requesting that a second avatar associated with the second user terminal visit the first virtual room;
updating the first virtual space data by updating a size of the first virtual screen based on a total number of avatars arranged in the first virtual room;
calculating billing information for both the first user terminal and the second user terminal based on the updated size; and
updating the visual-field image based on the updated first virtual space data.

2. The method according to claim 1, further comprising updating the first virtual space data by updating a size of the first virtual room based on the total number of avatars arranged in the first virtual room.

3. The method according to claim 2, further comprising automatically enlarging the size of the first virtual screen based on enlargement of the size of the first virtual room.

4. The method according to claim 1, further comprising updating a size of the first virtual room so as to maintain a relative positional relationship between the first avatar and the first virtual room, wherein the relative positional relationship is a positional relationship exhibited prior to the updating of the size of the first virtual room.

5. The method according to claim 1, further comprising:
determining a billing amount to be billed to a first user for viewing of the moving image on the first virtual screen; and
updating the billing amount to be billed to the first user based on the updated size of the first virtual screen.

6. The method according to claim 5, further comprising:
automatically enlarging the size of the first virtual screen based on enlargement of a size of the first virtual room; and
enlarging the size of the first virtual screen based on an instruction issued by one of a first user or a second user, wherein the one of the first user or the second user is billed a first billing amount in response to automatic enlargement of the size of the first virtual screen to a predetermined size based on the enlargement of the size of the first virtual room, the first billing amount being smaller than a second billing amount to be billed to the one of the first user or the second user in response to the size of the first virtual screen being enlarged to the predetermined size based on the instruction issued by the one of the first user and the second user.

7. The method according to claim 1, further comprising:
receiving, from the first user terminal, an instruction for requesting that the size of the first virtual screen be enlarged to a predetermined size; and
updating, based on the received instruction, the first virtual screen so as to enlarge the size of the first virtual screen to the predetermined size.

8. The method according to claim 7, further comprising:
determining a billing amount to be billed to a first user for viewing of the moving image performed by the first user; and
determining the billing amount to be billed to the first user based on the received instruction.

9. The method according to claim 1, wherein:
the first virtual space further includes the second avatar associated with the second user terminal and a third avatar associated with a third user terminal; and
the method further comprises:
receiving, in response to a voice being input to a voice input unit of the second user terminal, voice data representing the input voice from the second user terminal;
generating a second line-of-sight object based on a line of sight of the second avatar;
generating a third line-of-sight object based on a line of sight of the third avatar;
updating the second line-of-sight object so as to change a display form of the second line-of-sight object; and
displaying, in response to the updated second line-of-sight object and the third line-of-sight object existing within the visual field of the first avatar, the visual-field image including the updated second line-of-sight object and the third line-of-sight object on the HMD.

10. The method according to claim 9, further comprising:
generating the second line-of-sight object based on the line of sight of the second avatar in response to the second avatar existing outside of the visual field of the first avatar; and
generating the third line-of-sight object based on the line of sight of the third avatar in response to the third avatar existing outside of the visual field of the first avatar.

11. The method according to claim 1, wherein:
the first virtual space further includes the second avatar associated with the second user terminal and a third avatar associated with a third user terminal; and
the method further comprises:
receiving, in response to a voice being input to a voice input unit of the second user terminal, voice data representing the input voice from the second user terminal;
generating a second line-of-sight object based on the received voice data and a line of sight of the second avatar; and
displaying, in response to the second line-of-sight object existing within the visual field of the first avatar, the visual-field image including the second line-of-sight object on the HMD of the first user terminal.

12. The method according to claim 11, further comprising generating the second line-of-sight object based on the line of sight of the second avatar in response to the second avatar existing outside of the visual field of the first avatar.

13. The method according to claim 1, wherein:
the first virtual space further includes the second avatar associated with the second user terminal and a third avatar associated with a third user terminal; and the method further comprises:
receiving, in response to a voice being input to a voice input unit of the second user terminal, voice data representing the input voice from the second user terminal;
changing a display form of the second avatar in response to the voice being input to the voice input unit of the second user terminal with a line of sight of the second avatar being directed toward the first avatar under a state in which the second avatar exists outside of the visual field of the first avatar; and
displaying, in response to the second avatar existing within the visual field of the first avatar, the visual-field image including the updated second avatar on the HMD.

14. A system comprising:
a processor; and
a memory configured to store instructions thereon, wherein the processor is in communication with the memory, and the processor is configured to execute the instructions for:
generating first virtual space data for defining a first virtual space, the first virtual space includes:
a first avatar, which is associated with a first user terminal; and
a first virtual room, in which the first avatar and a first virtual screen are arranged, wherein the first virtual screen is configured to display a moving image, and the first virtual room is managed by the first user terminal;
receiving, from the first user terminal a detected movement of a head mounted device (HMD), wherein the HMD is included in the first user terminal;
identifying a visual field within the first virtual space in accordance with the detected movement of the HMD;
instructing the HMD to display a visual-field image corresponding to the visual field within the first virtual space;
receiving, from a second user terminal, a visiting request signal for requesting that a second avatar associated with the second user terminal visit the first virtual room;
updating the first virtual space data by updating a size of the first virtual screen based on a total number of avatars arranged in the first virtual room;
calculating billing information for both the first user terminal and the second user terminal based on the updated size; and
updating the visual-field image based on the updated first virtual space data.

15. The system according to claim 14, wherein the processor is further configured to execute the instructions for updating the first virtual space data by updating a size of the first virtual room based on the total number of avatars arranged in the first virtual room.

16. The system according to claim 14, wherein the processor is further configured to execute the instructions for updating a size of the first virtual room so as to maintain a relative positional relationship between the first avatar and the first virtual room, wherein the relative positional relationship is a positional relationship exhibited prior to the updating of the size of the first virtual room.

17. The system according to claim 14, wherein the processor is further configured to execute the instructions for:
determining a billing amount to be billed to a first user for viewing of the moving image on the first virtual screen; and
updating the billing amount to be billed to the first user based on the updated size of the first virtual screen.

18. A system comprising:
a first user terminal;
a second user terminal; and
a server in communication with the first user terminal and the second user terminal, wherein the server comprises:
a processor; and
a memory configured to store instructions thereon, wherein the processor is in communication with the memory, and the processor is configured to execute the instructions for:
generating first virtual space data for defining a first virtual space, the first virtual space includes:
a first avatar, which is associated with the first user terminal; and
a first virtual room, in which the first avatar and a first virtual screen are arranged, wherein the first virtual screen is configured to display a moving image, and the first virtual room is managed by the first user terminal;
receiving, from the first user terminal a detected movement of a head mounted device (HMD), wherein the HMD is included in the first user terminal;
identifying a visual field within the first virtual space in accordance with the detected movement of the HMD;
instructing the HMD to display a visual-field image corresponding to the visual field within the first virtual space;
receiving, from the second user terminal, a visiting request signal for requesting that a second avatar associated with the second user terminal visit the first virtual room;
updating the first virtual space data by updating a size of the first virtual screen based on a total number of avatars arranged in the first virtual room;
calculating billing information for both the first user terminal and the second user terminal based on the updated size; and
updating the visual-field image based on the updated first virtual space data.

19. The system according to claim 18, wherein the processor is further configured to execute the instructions for updating a size of the first virtual room so as to maintain a relative positional relationship between the first avatar and the first virtual room, wherein the relative positional relationship is a positional relationship exhibited prior to the updating of the size of the first virtual room.

20. The system according to claim 18, wherein the processor is further configured to execute the instructions for:
determining a billing amount to be billed to a first user for viewing of the moving image on the first virtual screen; and
updating the billing amount to be billed to the first user based on the updated size of the first virtual screen.

* * * * *